United States Patent
Zakharchenko et al.

(10) Patent No.: US 12,244,858 B2
(45) Date of Patent: Mar. 4, 2025

(54) SCALING PARAMETERS FOR V-PCC

(71) Applicant: Huawei Technologies Co., Ltd., Shenzhen (CN)

(72) Inventors: Vladyslav Zakharchenko, San Diego, CA (US); Jianle Chen, San Diego, CA (US); Jeffrey Moguillansky, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 17/865,376

(22) Filed: Jul. 14, 2022

(65) Prior Publication Data
US 2022/0353532 A1 Nov. 3, 2022

Related U.S. Application Data

(63) Continuation of application No. PCT/US2020/066882, filed on Dec. 23, 2020.

(60) Provisional application No. 62/961,028, filed on Jan. 14, 2020, provisional application No. 62/969,411, filed on Feb. 3, 2020.

(51) Int. Cl.
| | |
|---|---|
| H04N 19/597 | (2014.01) |
| G06T 1/20 | (2006.01) |
| G06T 15/00 | (2011.01) |
| G06T 17/20 | (2006.01) |
| G06T 19/00 | (2011.01) |
| H04N 19/132 | (2014.01) |
| H04N 19/176 | (2014.01) |
| H04N 19/46 | (2014.01) |

(52) U.S. Cl.
CPC ............ *H04N 19/597* (2014.11); *G06T 1/20* (2013.01); *G06T 15/005* (2013.01); *G06T 17/20* (2013.01); *G06T 19/006* (2013.01); *H04N 19/132* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 11,284,091 B2* | 3/2022 | Tourapis | H04N 19/124 |
| 2017/0347120 A1 | 11/2017 | Chou et al. | |
| 2019/0139266 A1 | 5/2019 | Budagavi et al. | |
| 2019/0197739 A1* | 6/2019 | Sinharoy | G06T 9/00 |
| 2021/0235058 A1* | 7/2021 | Yip | H04N 13/194 |

OTHER PUBLICATIONS

"Text of ISO/IEC DIS 23090-5 Video based Point Cloud Compression," 127, MPEG Meeting; Gothenburg; No. n18670, Oct. 10, 2019, XP030221914, 185 pages.

(Continued)

*Primary Examiner* — Rebecca A Volentine
(74) *Attorney, Agent, or Firm* — Conley Rose, P.C.

(57) ABSTRACT

A video coding mechanism is disclosed. The mechanism includes receiving a bitstream comprising a plurality of two-dimensional (2D) patches in an atlas frame and a three-dimensional (3D) bounding box scale. The 2D patches are decoded. A point cloud is reconstructed by converting the 2D patches to a 3D patch coordinate system defined by each projection plane of the 3D bounding box. The 3D bounding box scale is applied to a 3D bounding box.

17 Claims, 15 Drawing Sheets

(56) References Cited

OTHER PUBLICATIONS

"V-PCC Future Enhancements," 128, MPEG Meeting; Geneva; No. n18888, Jan. 12, 2020, XP030225588, 209 pages.
Zakharchenko (Futurewei) V et al: "[VPCC] [New Contribution] Extension of the volumetric usability information," 129. MPEG Meeting; Brussels; No. m52859, Jan. 17, 2020, XP030225424, 6 pages.
Tourapis (Apple) A M et al: [V-PCC] Object Annotation of Patches and Volumetric Rectangles in V-PCC, 129. MPEG Meeting; Brussels; (Motion Picture Expert Group or ISO/IEC JTC1/SC29/WG11) No. m5270511, Jan. 11, 2020, XP030225282, 14 pages.

* cited by examiner

SCALING PARAMETERS FOR V-PCC

CROSS-REFERENCE TO RELATED APPLICATIONS

This patent application is a continuation of International Application No. PCT/US2020/066882 filed on Dec. 23, 2020, by Futurewei Technologies, Inc., and titled "Scaling Parameters For V-PCC," which claims the benefit of U.S. Provisional Patent Application No. 62/969,411, filed Feb. 3, 2020 by Futurewei Technologies, Inc., and titled "Signaling Physical Dimensions of the Point Cloud Sample," and of U.S. Provisional Patent Application No. 62/961,028, filed Jan. 14, 2020 by Futurewei Technologies, Inc., and titled "Signaling Physical Dimensions of the Point Cloud Sample", the disclosures of which are hereby incorporated by reference in their entirety.

TECHNICAL FIELD

The present disclosure is generally related to video coding, and more particularly to improvements to support scaling a coded point cloud based on associated physical dimensions in Video Point Cloud Coding (V-PCC).

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in image quality are desirable.

SUMMARY

In an embodiment, the disclosure includes a method implemented by a decoder, the method comprising: receiving, by a receiver of the decoder, a bitstream comprising a plurality of two-dimensional (2D) patches in an atlas frame and a three-dimensional (3D) bounding box scale; decoding, by a processor of the decoder, the 2D patches; reconstructing a point cloud by converting, by the processor, the 2D patches to a 3D patch coordinate system defined by each projection plane of the 3D bounding box; and applying, by the processor, the 3D bounding box scale to the 3D bounding box.

Point Cloud Coding (PCC) systems code the cloud of points by projecting the points onto faces of a 3D bounding box. This converts the data between an encodable 2D format and a displayable 3D format and vice versa. For example, encoding the point cloud may include projecting the a 2D representation onto each face of the 3D bounding box, with results in a set of encodable 2D patches. Further, reconstructing the point cloud can include projecting the 2D patches from the 3D bounding box faces onto points (based on geometry data) to reconstruct a 3D point cloud. The 3D bounding box employs a local coordinate system and a predetermined unit size. Accordingly, different point clouds may be coded to a common standard size. However, there are instances when the point cloud should be scaled to real world sizes. For example, a point cloud of an object may be coded based on a 3D bounding box of a predefined size. The point cloud may then be employed in an augmented reality (AR) context. In AR, pre-recorded and/or computer-generated content is overlaid onto real-time video taken by an end user. Some Video PCC systems may be unable to properly integrate the point cloud onto the video due to a mismatch between the local coordinate system and the size of the objects filmed by the user.

The present example includes a 3D bounding box scale, which is a parameter that can be encoded into a PCC bitstream. The 3D bounding box scale is a parameter that transforms coded sample positions from the point cloud from the local coordinate system to a final real-world coordinate system. This allows the reconstructed point cloud to be sized correctly so that the reconstructed point cloud can be overlaid onto real world video. The 3D bounding box scale is a factor based on a sample density in the 3D bounding box and a size of the 3D bounding box. The 3D bounding box scale may be expressed in meters. Further, a flag can be encoded into the PCC bitstream to indicate whether a 3D bounding box scale is present. Upon receipt, the decoder can read the flag and obtain the 3D bounding box scale based on the flag. The decoder can then scale the 3D bounding box, decode the patches, reconstruct the point cloud based on the 3D bounding box, and overlay the reconstructed point cloud onto real world video. Hence, the present example increases functionality at both an encoder and decoder by creating AR support. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the bitstream further comprises a flag indicating whether 3D bounding box information is present.

Optionally, in any of the preceding aspects, another implementation of the aspect provides, wherein the 3D bounding box scale is applied based on a value of the flag.

Optionally, in any of the preceding aspects, another implementation of the aspect provides, wherein the 3D patch coordinate system is transformed to a target 3D coordinate system in units of meters.

Optionally, in any of the preceding aspects, another implementation of the aspect provides, wherein the bitstream further comprises occupancy components, geometry components, and attribute components, and wherein the point cloud is reconstructed based on the occupancy components, geometry components, and attribute components.

Optionally, in any of the preceding aspects, another implementation of the aspect provides, wherein the occupancy components inform the decoder which samples in 2D components are associated with video data, wherein the geometry components include information indicating a location of the samples in 3D space, and wherein the attribute components provide properties of the samples.

Optionally, in any of the preceding aspects, another implementation of the aspect provides, further comprising forwarding, by the processor, a reconstructed atlas frame for display.

In an embodiment, the disclosure includes a method implemented by an encoder, the method comprising: employing, by a processor of the encoder, orthographic projection onto a 3D bounding box to generate a plurality of 2D patches representing a point cloud; encoding, by the processor, the 2D patches into an atlas frame in a bitstream; determining, by the processor, a 3D bounding box scale for application to the 3D bounding box; encoding, by the processor, the 3D bounding box scale into the bitstream; and storing, by a memory of the encoder, the bitstream for communication toward a decoder.

PCC systems code the cloud of points by projecting the points onto faces of a 3D bounding box. This converts the data between an encodable 2D format and a displayable 3D format and vice versa. For example, encoding the point cloud may include projecting the a 2D representation onto each face of the 3D bounding box, with results in a set of encodable 2D patches. Further, reconstructing the point cloud can include projecting the 2D patches from the 3D bounding box faces onto points (based on geometry data) to reconstruct a 3D point cloud. The 3D bounding box employs a local coordinate system and a predetermined unit size. Accordingly, different point clouds may be coded to a common standard size. However, there are instances when the point cloud should be scaled to real world sizes. For example, a point cloud of an object may be coded based on a 3D bounding box of a predefined size. The point cloud may then be employed in an AR context. In AR, pre-recorded and/or computer-generated content is overlaid onto real-time video taken by an end user. Some Video PCC systems may be unable to properly integrate the point cloud onto the video due to a mismatch between the local coordinate system and the size of the objects filmed by the user.

The present example includes a 3D bounding box scale, which is a parameter that can be encoded into a PCC bitstream. The 3D bounding box scale is a parameter that transforms coded sample positions from the point cloud from the local coordinate system to a final real-world coordinate system. This allows the reconstructed point cloud to be sized correctly so that the reconstructed point cloud can be overlaid onto real world video. The 3D bounding box scale is a factor based on a sample density in the 3D bounding box and a size of the 3D bounding box. The 3D bounding box scale may be expressed in meters. Further, a flag can be encoded into the PCC bitstream to indicate whether a 3D bounding box scale is present. Upon receipt, the decoder can read the flag and obtain the 3D bounding box scale based on the flag. The decoder can then scale the 3D bounding box, decode the patches, reconstruct the point cloud based on the 3D bounding box, and overlay the reconstructed point cloud onto real world video. Hence, the present example increases functionality at both an encoder and decoder by creating AR support. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the 3D bounding box scale includes parameters to rescale samples in the 3D bounding box from a local coordinate system to a real-world size.

Optionally, in any of the preceding aspects, another implementation of the aspect provides, further comprising encoding into the bitstream, by the processor, a flag indicating whether 3D bounding box information is present.

Optionally, in any of the preceding aspects, another implementation of the aspect provides, wherein a value of the flag indicates whether to apply the 3D bounding box scale to the 3D bounding box.

Optionally, in any of the preceding aspects, another implementation of the aspect provides, wherein the 3D bounding box is scaled in units of meters.

Optionally, in any of the preceding aspects, another implementation of the aspect provides, further comprising encoding, by the processor, occupancy components, geometry components, and attribute components into the bitstream.

Optionally, in any of the preceding aspects, another implementation of the aspect provides, wherein the occupancy components inform the decoder which samples in the atlas frame are associated with video data, wherein the geometry components contain information indicating a location of the samples in 3D space, and wherein the attribute components provide properties of the samples.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a plurality of 2D patches in an atlas frame and a 3D bounding box scale; a decoding means for decoding the patches; a reconstruction means for reconstructing a point cloud by converting the patches to a 3D patch coordinate system defined by each projection plane of the 3D bounding box; and an application means for applying the 3D bounding box scale to the 3D bounding box.

PCC systems code the cloud of points by projecting the points onto faces of a 3D bounding box. This converts the data between an encodable 2D format and a displayable 3D format and vice versa. For example, encoding the point cloud may include projecting the a 2D representation onto each face of the 3D bounding box, with results in a set of encodable 2D patches. Further, reconstructing the point cloud can include projecting the 2D patches from the 3D bounding box faces onto points (based on geometry data) to reconstruct a 3D point cloud. The 3D bounding box employs a local coordinate system and a predetermined unit size. Accordingly, different point clouds may be coded to a common standard size. However, there are instances when the point cloud should be scaled to real world sizes. For example, a point cloud of an object may be coded based on a 3D bounding box of a predefined size. The point cloud may then be employed in an AR context. In AR, pre-recorded and/or computer-generated content is overlaid onto real-time video taken by an end user. Some Video PCC systems may be unable to properly integrate the point cloud onto the video due to a mismatch between the local coordinate system and the size of the objects filmed by the user.

The present example includes a 3D bounding box scale, which is a parameter that can be encoded into a PCC bitstream. The 3D bounding box scale is a parameter that transforms coded sample positions from the point cloud from the local coordinate system to a final real-world coordinate system. This allows the reconstructed point cloud to be sized correctly so that the reconstructed point cloud can be overlaid onto real world video. The 3D bounding box scale is a factor based on a sample density in the 3D bounding box and a size of the 3D bounding box. The 3D bounding box scale may be expressed in meters. Further, a flag can be encoded into the PCC bitstream to indicate whether a 3D bounding box scale is present. Upon receipt, the decoder can read the flag and obtain the 3D bounding box scale based on the flag. The decoder can then scale the 3D bounding box, decode the patches, reconstruct the point cloud based on the 3D bounding box, and overlay the reconstructed point cloud onto real world video. Hence, the present example increases functionality at both an encoder and decoder by creating AR support. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the decoder is further configured to perform the method of any of the preceding aspects.

In an embodiment, the disclosure includes an encoder comprising: an employing means for employing orthographic projection onto a 3D bounding box to generate a plurality of 2D patches representing a point cloud; a determining means for determining a 3D bounding box scale for application to the 3D bounding box; an encoding means for: encoding the 2D patches into an atlas frame in a bitstream; and encoding the 3D bounding box scale into the bitstream; and a storing means for storing the bitstream for communication toward a decoder.

PCC systems code the cloud of points by projecting the points onto faces of a 3D bounding box. This converts the data between an encodable 2D format and a displayable 3D format and vice versa. For example, encoding the point cloud may include projecting the a 2D representation onto each face of the 3D bounding box, with results in a set of encodable 2D patches. Further, reconstructing the point cloud can include projecting the 2D patches from the 3D bounding box faces onto points (based on geometry data) to reconstruct a 3D point cloud. The 3D bounding box employs a local coordinate system and a predetermined unit size. Accordingly, different point clouds may be coded to a common standard size. However, there are instances when the point cloud should be scaled to real world sizes. For example, a point cloud of an object may be coded based on a 3D bounding box of a predefined size. The point cloud may then be employed in an AR context. In AR, pre-recorded and/or computer-generated content is overlaid onto real-time video taken by an end user. Some Video PCC systems may be unable to properly integrate the point cloud onto the video due to a mismatch between the local coordinate system and the size of the objects filmed by the user.

The present example includes a 3D bounding box scale, which is a parameter that can be encoded into a PCC bitstream. The 3D bounding box scale is a parameter that transforms coded sample positions from the point cloud from the local coordinate system to a final real-world coordinate system. This allows the reconstructed point cloud to be sized correctly so that the reconstructed point cloud can be overlaid onto real world video. The 3D bounding box scale is a factor based on a sample density in the 3D bounding box and a size of the 3D bounding box. The 3D bounding box scale may be expressed in meters. Further, a flag can be encoded into the PCC bitstream to indicate whether a 3D bounding box scale is present. Upon receipt, the decoder can read the flag and obtain the 3D bounding box scale based on the flag. The decoder can then scale the 3D bounding box, decode the patches, reconstruct the point cloud based on the 3D bounding box, and overlay the reconstructed point cloud onto real world video. Hence, the present example increases functionality at both an encoder and decoder by creating AR support. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the encoder is further configured to perform the method of any of the preceding aspects.

In an embodiment, the disclosure includes a method implemented by a user equipment (UE), the method comprising: decoding from a video point cloud coding (V-PCC) bitstream, by a central processing unit (CPU), patches from atlas data and vertices from geometry data; storing the patches and the vertices in one or more buffers; binding, by a GPU, the patches and the vertices to one or more GPU shaders as textures; rendering, by the GPU shaders, the patches onto the vertices via transformation matrices to generate a 2D image of a 3D reconstructed point cloud.

Various rendering technologies exist to render video data. However, a simplistic application of rendering technologies to PCC video data may result in an inefficient rendering process. For example, many types of video data include a single type of data that can be decoded, transferred from a CPU to a graphic processing unit (GPU), and rendered for display. However, PCC employs multiple types of video data that interact with each other. Accordingly, some rendering systems may decode and transfer atlas, geometry, occupancy, and/or attribute video data from the CPU to the GPU for certain rendering tasks. Then the data is transferred back to the CPU to be combined. The results are then transferred back to the GPU for complete rendering prior to display. Such movement between the CPU and GPU results in multiple transfers between CPU buffers and GPU buffers for each rendered frame, which significantly increases latency and resource usage in the rendering process.

The present example includes a V-PCC renderer configured to prevent repeated memory movements during the rendering process. The CPU may be used to decode atlas data (e.g., patches), occupancy, geometry (e.g., vertexes), and/or attribute data. Such data is stored in one or more buffers, such as a vertex buffer and/or a uniform buffer. GPU shaders can then be bound to the data in the buffers to reconstruct a 3D point cloud and render a 2D image from the point cloud. For example, a GPU shader can apply occupancy as a texture to remove patch data, geometry data, and/or attribute data that are artifacts from the compression process. Another GPU shader can initialize a model matrix and generate vertices in a 3D model from the geometry data. Yet another shader can project patches and/or attributes onto the vertices as textures. This can be performed without copying such data from CPU buffers to GPU buffers. Transforms can also be used to generate a 2D image for display from the 3D point cloud. Textures, such as sub-blocks of patches, can be assigned to multiple shaders, which increases parallel processing capabilities at the GPU. In some examples, an entire frame of a V-PCC image can be rendered with a single draw call to the GPU. Such rendering can be performed fast enough to allow most user equipment devices to employ V-PCC content in AR applications. As such, the disclosed examples increase capabilities of decoders when decoding V-PCC data. Further, the present examples decrease processor, memory, and/or GPU resource usage, and hence increase the functionality of a decoder.

Optionally, in any of the preceding aspects, another implementation of the aspect provides, wherein the GPU shaders render the patches on the vertices without copying patches or vertices into GPU memory.

Optionally, in any of the preceding aspects, another implementation of the aspect provides, wherein rendering the patches onto the vertices includes rendering all patches associated with a single V-PCC frame onto the vertices in parallel in response to a single draw call from the CPU.

Optionally, in any of the preceding aspects, another implementation of the aspect provides, wherein rendering patches in parallel includes obtaining patch indices for the patches from the CPU buffers and determining patch orientation for each of the patches based on the patch indices.

Optionally, in any of the preceding aspects, another implementation of the aspect provides, further comprising: decoding, by the CPU, an occupancy from the V-PCC bitstream; storing the occupancy in the buffers; binding, by the GPU, the occupancy to the GPU shaders as a texture; and applying the occupancy, by the GPU shaders, to reject one or more points associated with the vertices prior to rendering the patches onto the vertices.

Optionally, in any of the preceding aspects, another implementation of the aspect provides, wherein the occupancy is applied to the patches and the vertices.

Optionally, in any of the preceding aspects, another implementation of the aspect provides, further comprising initializing a model matrix to fit the vertices to a normalized unit square around an origin prior to rendering the patches onto the vertices.

Optionally, in any of the preceding aspects, another implementation of the aspect provides, further comprising subdividing, by the GPU, the patches into sub-blocks, wherein each sub-block is rendered by a different GPU shader.

Optionally, in any of the preceding aspects, another implementation of the aspect provides, wherein the buffers include a uniform buffer that stores the patches in cache memory.

Optionally, in any of the preceding aspects, another implementation of the aspect provides, wherein the buffers include a vertex buffer that stores the vertices.

Optionally, in any of the preceding aspects, another implementation of the aspect provides, wherein the GPU shaders include a geometry shader, a compute shader, or combinations thereof.

Optionally, in any of the preceding aspects, another implementation of the aspect provides, wherein a maximum number of vertices emitted by a geometry shader is equal to an occupancy resolution times a number of layers.

Optionally, in any of the preceding aspects, another implementation of the aspect provides, wherein rendering the patches onto the vertices via transformation matrices includes rendering the patches and vertices onto a recorded image to create augmented reality (AR) content.

Optionally, in any of the preceding aspects, another implementation of the aspect provides, wherein the transformation matrices include a canvas to patch matrix for transforming from an atlas space to a patch space, a model matrix for transforming from a model space to a world space, a camera view matrix for transforming the world space to a camera space, and a projection matrix from transforming from the camera space to a screen space.

Optionally, in any of the preceding aspects, another implementation of the aspect provides, wherein rendering the patches onto the vertices includes projecting the patches onto points of the vertices.

Optionally, in any of the preceding aspects, another implementation of the aspect provides, further comprising forwarding the 2D image of the 3D point cloud toward a screen.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
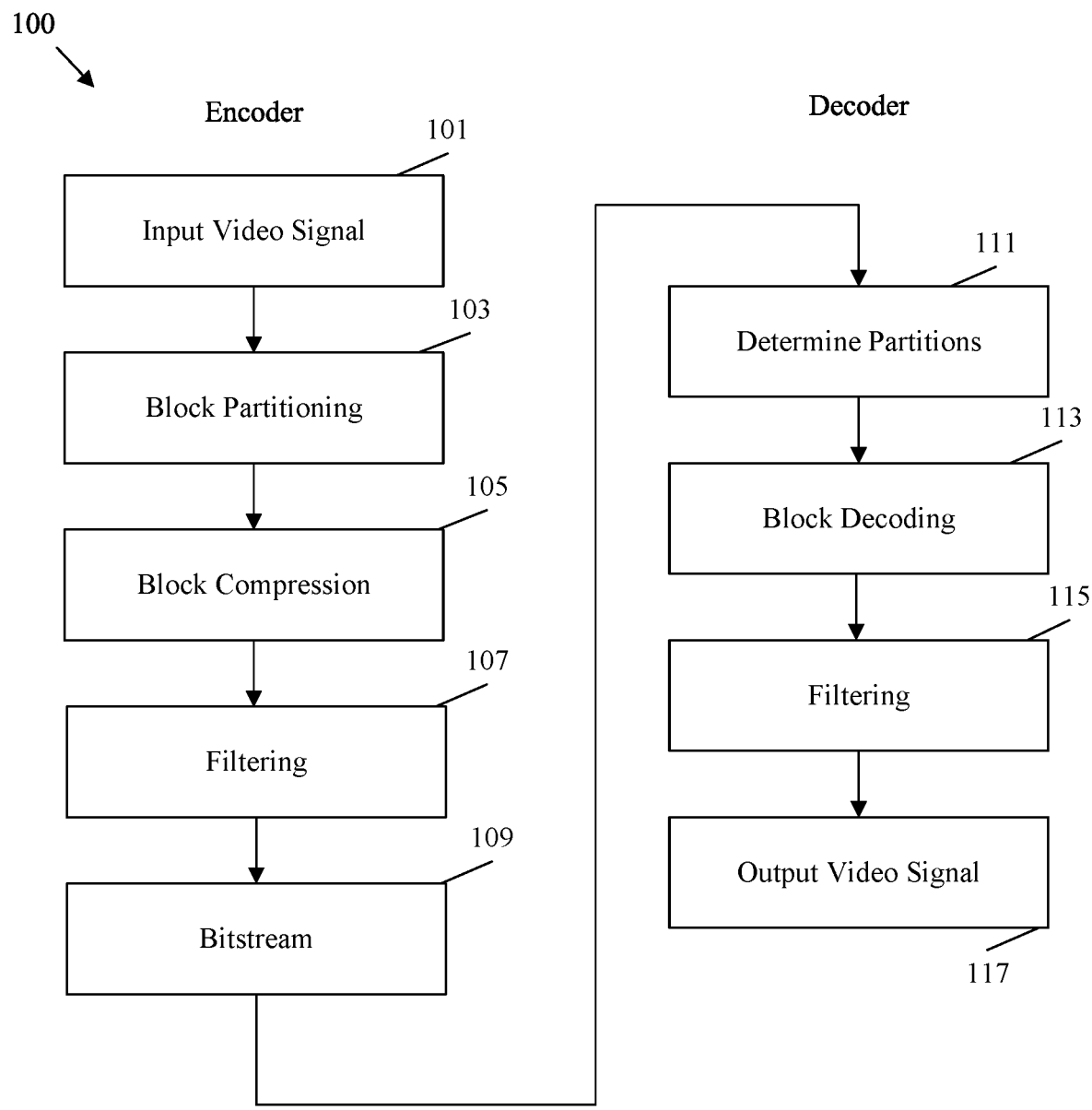
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

An encoder is a device that is configured to employ encoding processes to compress video data into a bitstream. A decoder is a device that is configured to employ decoding processes to reconstruct video data from a bitstream for display. A point cloud/point cloud representation is a group of points (e.g., samples) in three-dimensional (3D) space, where each point may contain a position, a color, and/or attribute(s). A 3D cloud of points is a set of data points space. A bitstream is a sequence of bits including video data that is compressed for transmission between an encoder and a decoder. In a Point Cloud Coding (PCC) context, a bitstream includes a sequence of bits of coded video point cloud compression (V-PCC) components and associated parameters.

A V-PCC component (or more generally a PCC component) may be atlas data, occupancy data, geometry data, or attribute data of a particular type that is associated with a V-PCC point cloud. An atlas/atlas frame may be a collection of two-dimensional (2D) bounding boxes (also known as patches) projected into rectangular frames that correspond to a volume in 3D space, known as a 3D bounding box, upon which volumetric data is rendered. Each 2D bounding box/patch represents a subset of a point cloud. A patch is a 2D rectangular region within an atlas associated with volumetric information. A 3D bounding box is a volume defined as a cuboid solid having six rectangular faces placed at right angles. A 3D bounding box scale is a parameter that indicates a scale to be applied to the 3D bounding box parameters that may be specified for an object. A 3D patch coordinate system is a mechanism for employing numbers to uniquely identify locations corresponding to samples of patches in 3D space. An occupancy are values that indicate whether atlas samples correspond to associated samples in 3D space. An occupancy frame may be a collection of occupancy values that constitute a 2D array and represents the entire occupancy information for a single atlas frame. Accordingly, occupancy frame may indicate, for each sample position in the atlas, whether that position corresponds to a valid 3D point in the point cloud representation. A geometry is a set of cartesian coordinates associated with a volumetric frame. A geometry map is a frame containing geometry patch information projected at a particular depth. An attribute may be a scalar or vector property optionally associated with each point in a volumetric frame of a point cloud such as color, reflectance, surface normal, time stamps, material identifier (ID), etc. A volumetric frame is set of 3D points specified by cartesian coordinates and zero or more corresponding sets of attributes at a particular time instance. A complete set of atlas data, occupancy, geometry maps, or attributes associated with a particular time instance/volumetric frame may be referred to as an atlas frame, an occupancy frame, a geometry frame, and an attribute frame, respectively. Atlas data, occupancy data, geometry data, or attribute data may be components of a point cloud, and hence may be referred to as atlas components, occupancy components, geometry components, and attribute frame components, respectively. A flag is a value that signals data for an associated function or process.

Video Point Cloud Coding (PCC) is a mechanism for efficiently coding a three-dimensional (3D) objects represented by a 3D cloud of points of varying color, light, and/or other attributes. The point cloud and associated motion/changes are captured over time and included in PCC components. The PCC components are then encoded. The position of each valid point in the cloud at a time instance is stored as a geometry map in a geometry frame. The colors and luminance are stored as patches. Specifically, the patches at an instant in time are packed into an atlas frame. The patches generally do not cover the entire atlas frame. Accordingly, occupancy frames are also generated that indicate which portions of atlas frame contain patch data. Optionally, attributes of the points, such as transparency, may be included in an attribute frame. As such, each PCC frame can be encoded as a plurality of frames containing different components describing the point cloud at a corresponding instant.

PCC systems code the cloud of points by projecting the points onto faces of a 3D bounding box. This converts the data between an encodable 2D format and a displayable 3D format and vice versa. For example, encoding the point cloud may include projecting the a 2D representation onto each face of the 3D bounding box, with results in a set of encodable 2D patches. Further, reconstructing the point cloud can include projecting the 2D patches from the 3D bounding box faces onto points (based on geometry data) to reconstruct a 3D point cloud. The 3D bounding box employs a local coordinate system and a predetermined unit size. Accordingly, different point clouds may be coded to a common standard size. However, there are instances when the point cloud should be scaled to real world sizes. For example, a point cloud of an object may be coded based on a 3D bounding box of a predefined size. The point cloud may then be employed in an augmented reality (AR) context. In AR, pre-recorded and/or computer-generated content is overlaid onto real-time video taken by an end user. Some Video PCC systems may be unable to properly integrate the point cloud onto the video due to a mismatch between the local coordinate system and the size of the objects filmed by the user.

Disclosed herein is a 3D bounding box scale, which is a parameter that can be encoded into a PCC bitstream. The 3D bounding box scale is a parameter that transforms coded sample positions from the point cloud from the local coordinate system to a final real-world coordinate system. This allows the reconstructed point cloud to be sized correctly so that the reconstructed point cloud can be overlaid onto real world video. The 3D bounding box scale is a factor based on a sample density in the 3D bounding box and a size of the 3D bounding box. The 3D bounding box scale may be expressed in meters. Further, a flag can be encoded into the PCC bitstream to indicate whether a 3D bounding box scale is present. Upon receipt, the decoder can read the flag and obtain the 3D bounding box scale based on the flag. The decoder can then scale the 3D bounding box, decode the patches, reconstruct the point cloud based on the 3D bounding box, and overlay the reconstructed point cloud onto real world video. Hence, the present example increases functionality at both an encoder and decoder by creating AR support. Further, the present disclosure supports mechanisms to increase coding efficiency, and hence supports a reduction in processor, memory, and/or network resource usage at an encoder and/or a decoder.

FIGS. 1-4 describe various coding mechanisms used to encode and decode a video. FIGS. 5-8 describe mechanisms used to covert a point cloud into a format that can be encoded and decoded by the mechanisms described in FIGS. 1-4.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three-dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
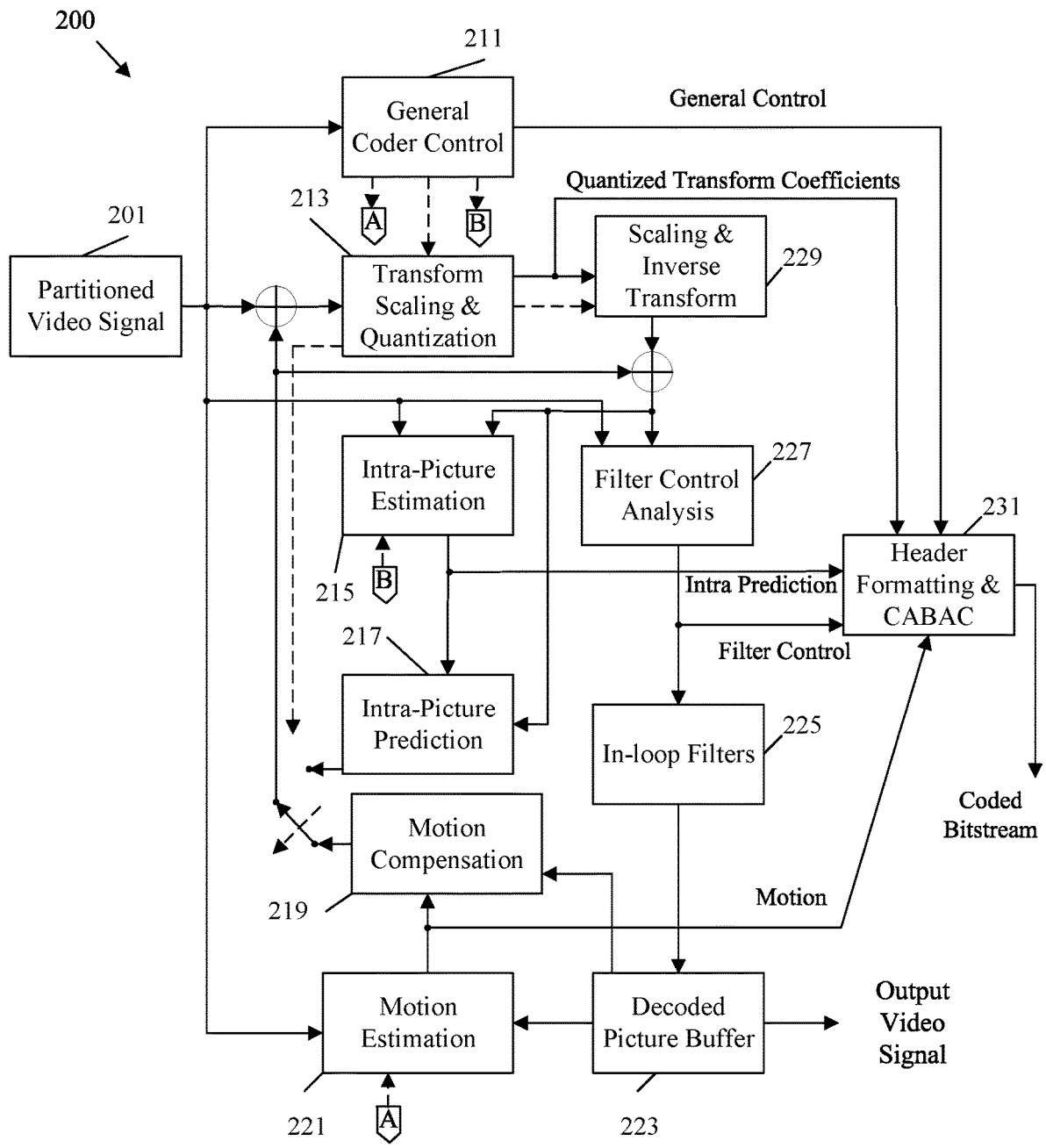
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
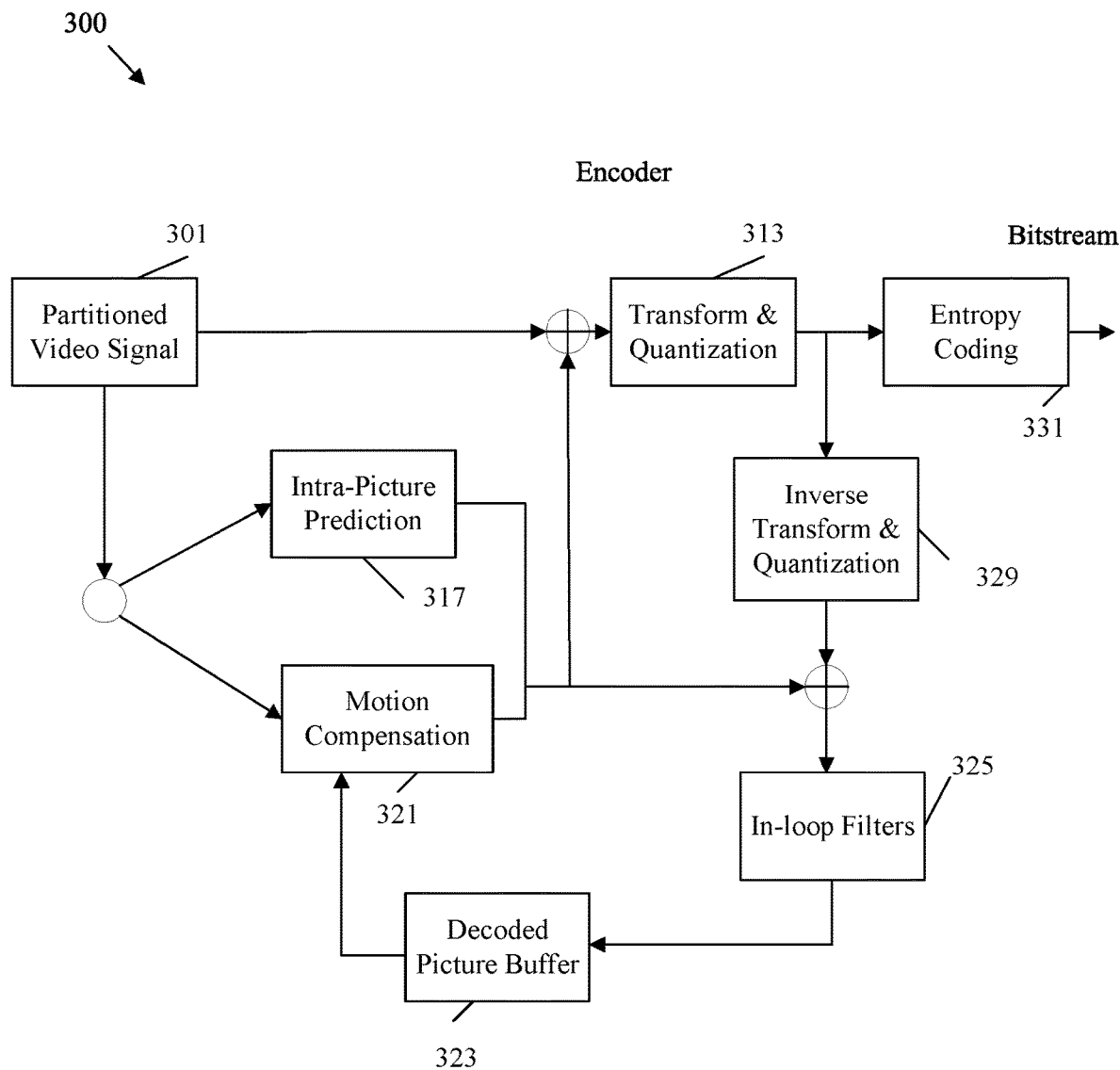
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
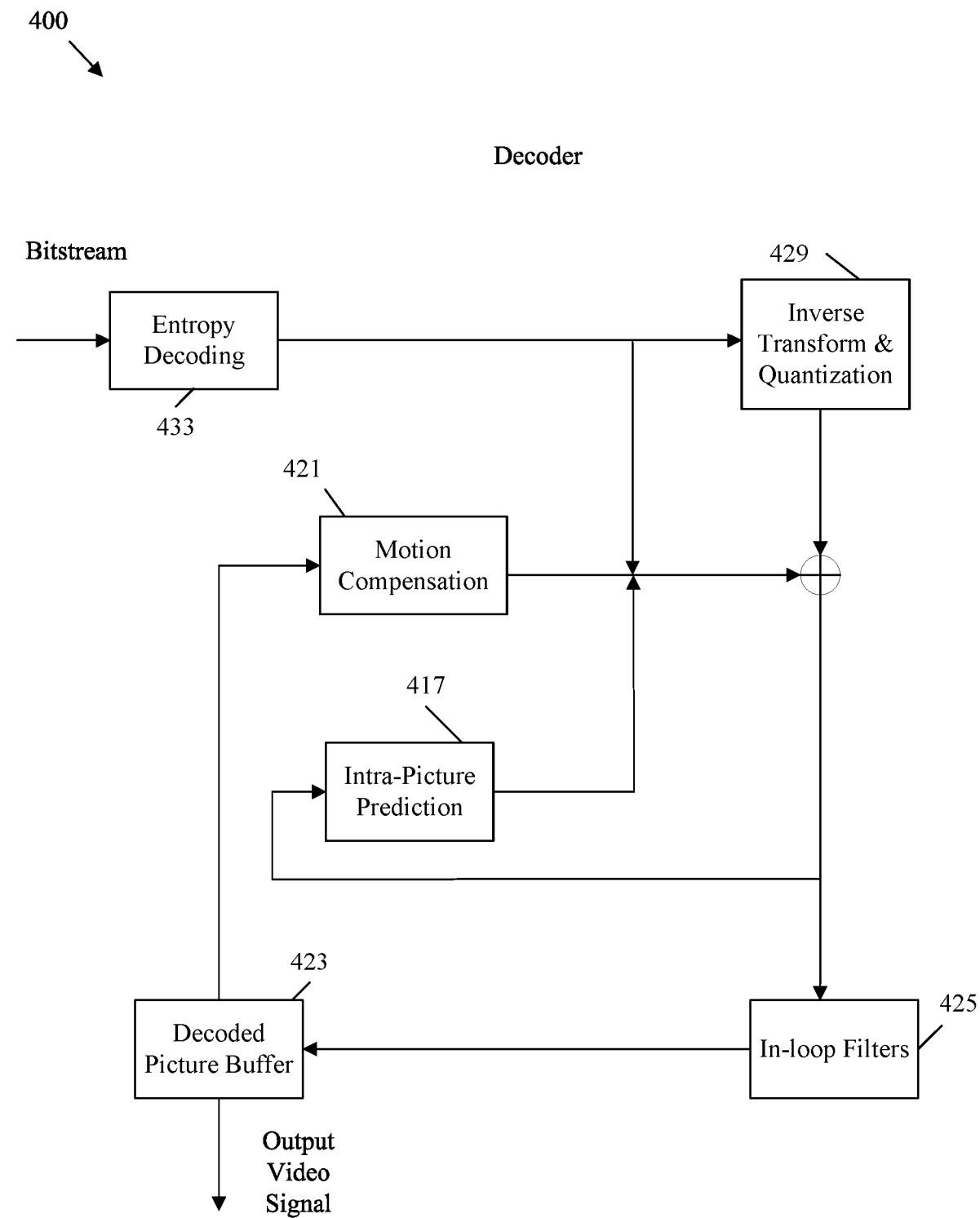
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The preceding mechanisms are example machines and/or processes that can be employed to encoded and decode 2D video presented in square/rectangular frames. However, PCC video data uses points to represent an irregular 3D object. The following mechanisms are PCC specific video coding processes. These mechanisms can be employed to represent a 3D point cloud in 2D square/rectangular frames so that the 2D frames can be encoded/decoded by the preceding mechanisms. As a general example, the 3D point cloud at a particular instant in time can be described by a geometry frame that indicates the position of each point. The color values and light values of the points can be represented as 2D patches that are projected onto the points as indicated by the geometry frame. The patches for an instant in time are packed into a square/rectangular atlas frame, which can be encoded/decoded by the mechanism described above. As the patches may not completely cover the atlas frame, a corresponding occupancy frame can be employed to indicate which areas of the atlas frame contain patch data and which areas are empty of usable video data. Any additional attributes for the points can be coded in corresponding attribute frames. The following describes these mechanisms in more detail.

Figure 5:
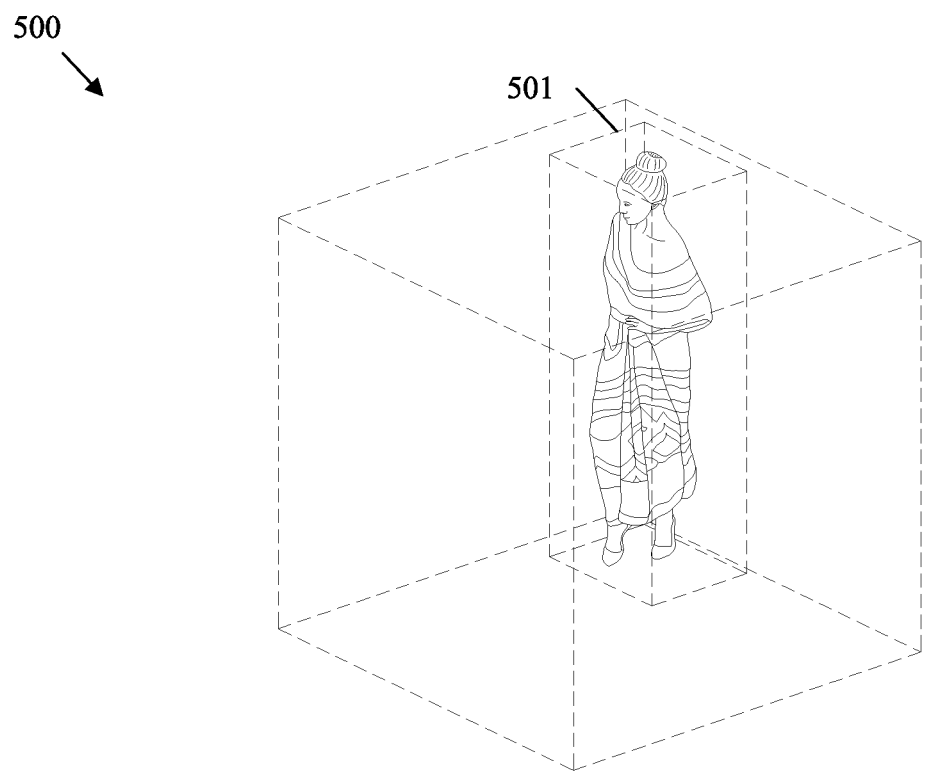
FIG. 5 is an example of point cloud media that can be coded according to Point Cloud Compression (PCC) mechanisms.

FIG. 5 is an example of point cloud media 500 that can be coded according to PCC mechanisms. Accordingly, point cloud media 500 may be coded by an encoder, such as codec system 200 and/or encoder 300, and reconstructed by a decoder, such as codec system 200 and/or decoder 400, when performing method 100.

The mechanisms described in FIGS. 1-4 generally presume a 2D frame is being coded. However, point cloud media 500 is a cloud of points that change over time. Specifically, the point cloud media 500, which can also be referred to as a point cloud and/or a point cloud representation, is group of points in 3D space. The points may also be referred to as samples. Each point may be associated with multiple types of data. For example, each point may be described in terms of position. Position is a location in 3D space that may be described as a set of Cartesian coordinates. Further, each point may contain a color. Color may be described in terms of luminance (e.g., light) and chrominance (e.g., color). Color may be described in terms of (R), green (G), and blue (B) values, or luma (Y), blue projection (U), and red projection (V), denoted as (R, G, B) or (Y, U, V), respectively. The points may also include other attributes. An attribute is an optional scalar or a vector property that may be associated with each point in a point cloud. Attributes may include reflectance, transparency, surface normal, time stamps, material identifier (ID), etc.

As each point in a point cloud media 500 may be associated with multiple types of data, several supporting mechanisms are employed to prepare the point cloud media 500 for compression according to the mechanisms described in FIGS. 1-4. For example, the point cloud media 500 can be sorted into frames, where each frame includes all the data related to a point cloud for a particular state or instant in time. As such, FIG. 5 depicts a single frame of the point cloud media 500. The point cloud media 500 is then coded on a frame by frame basis. The point cloud media 500 can be surrounded by a 3D bounding box 501. The 3D bounding box 501 is a 3D rectangular prism that is sized to surround all of the points of the point cloud media 500 for the corresponding frame. The 3D bounding box 501 may be formally defined as a volume defined as a cuboid solid having six rectangular faces placed at right angles. It should be noted that multiple 3D bounding boxes 501 may be employed in the event that the point cloud media 500 includes disjoint sets. For example, the point cloud media 500 could depict two figures that are not connected, in which case a 3D bounding box 501 would be placed around each figure. The points in the 3D bounding box 501 are processed as described below.

Figure 6:
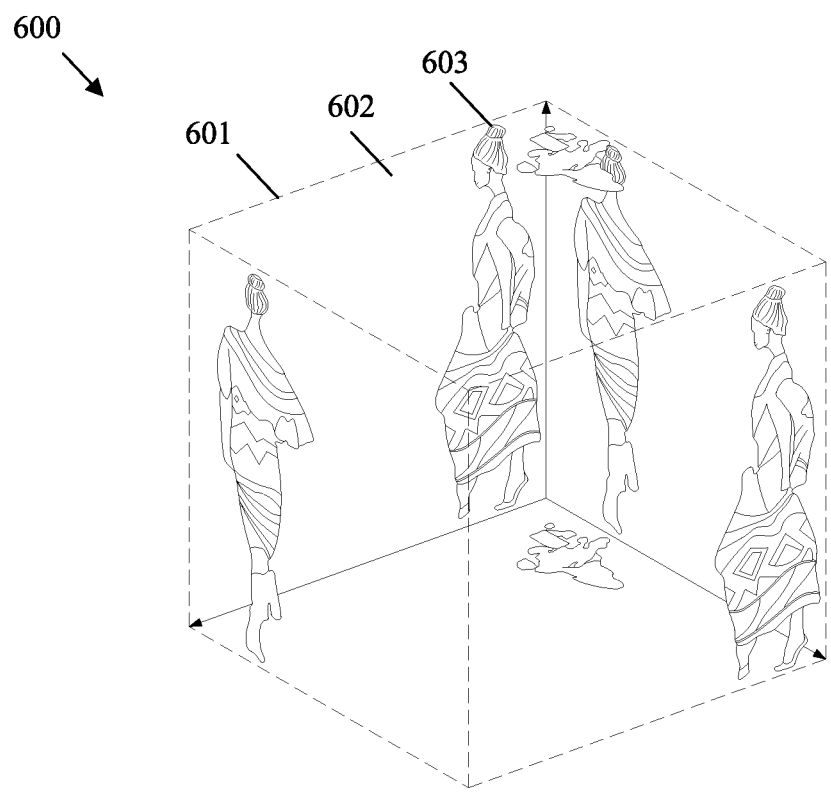
FIG. 6 is an example of patches created from a point cloud.

FIG. 6 is an example of patches 603 created from a point cloud 600. Point cloud 600 is a single frame of point cloud media 500. Further, point cloud 600 is surrounded by a 3D bounding box 601 that is substantially similar to 3D bounding box 501. Accordingly, point cloud 600 may be coded by an encoder, such as codec system 200 and/or encoder 300, and reconstructed by a decoder, such as codec system 200 and/or decoder 400, when performing method 100.

The 3D bounding box 601 includes six faces, and hence includes six 2D rectangular frames 602 that are each positioned at a face of the 3D bounding box 601 (e.g., top, bottom, left, right, front, and back). The point cloud 600 can be converted from 3D data into 2D data by projecting the point cloud 600 onto the corresponding 2D rectangular frames 602. This results in the creation of patches 603. It should be noted that the 2D rectangular frames 602 may also be referred to as 2D bounding boxes (e.g., of the 3D bounding box 601). A patch 603 is a 2D representation of a 3D point cloud, where the patch 603 contains a representation of the point cloud 600 that is visible from the corresponding 2D rectangular frame 602. A patch 603 may be formally defined as a 2D rectangular region within an atlas associated with volumetric information. It should be noted that a representation of the point cloud 600 from a 2D rectangular frame 602 may contain multiple disjoint components. As such, a 2D rectangular frame 602 may contain a plurality of patches 603. Accordingly, a point cloud 600 may be represented by more than six patches 603. The patches 603 may also be referred to as atlas, atlas data, atlas information, and/or atlas components. By converting the 3D data into a 2D format, the patches 603 of the point cloud 600 can be coded according to video coding mechanisms, such as inter-prediction and/or intra-prediction.

Figure 7A:
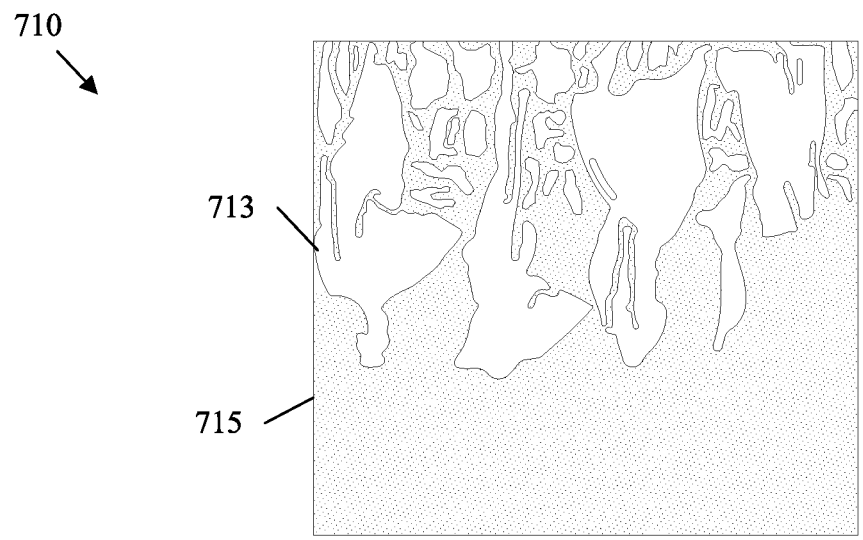
FIG. 7A illustrates an example occupancy frame associated with a set of patches.
Figure 7B:
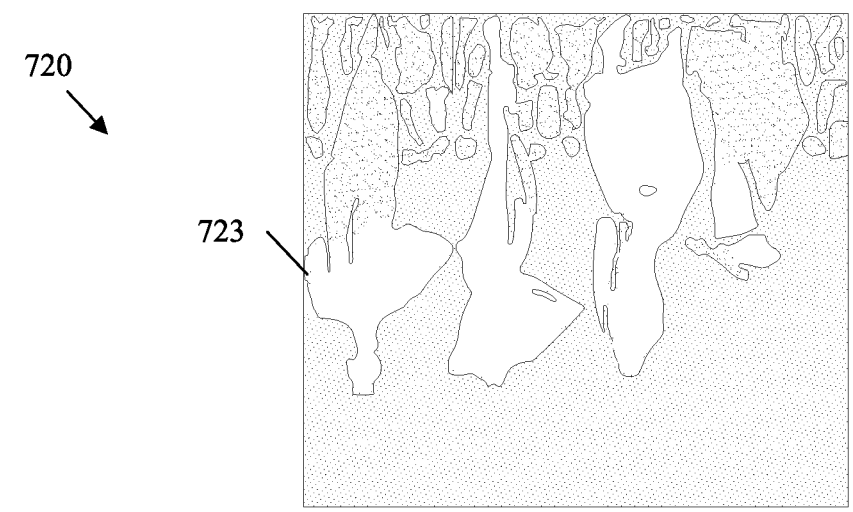
FIG. 7B illustrates an example geometry frame associated with a set of patches.
Figure 7C:
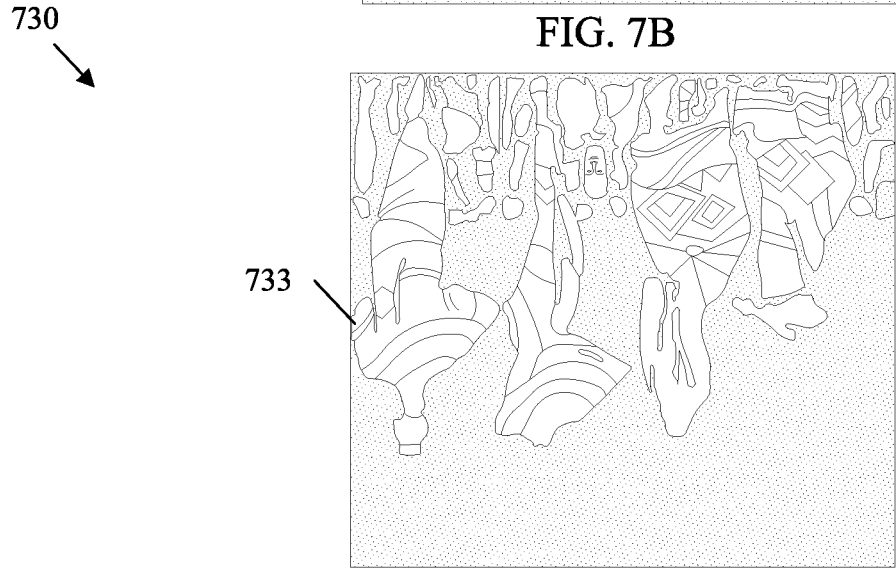
FIG. 7C illustrates an example atlas frame associated with a set of patches.

FIGS. 7A-7C illustrate mechanisms for encoding a 3D point cloud that has been converted into 2D information as described in FIG. 6. Specifically, FIG. 7A illustrates an example occupancy frame 710 associated with a set of patches, such as patches 603. The occupancy frame 710 contains occupancy 713 and 715 with value coded in binary form. Occupancy 713 and 715 are values that indicate whether atlas samples correspond to associated samples in 3D space. For example, an occupancy value of zero, depicted as occupancy 715, represents that a portion of the bounding box 601 is not occupied by one of the patches 603. Those portions of the bounding box 601 represented by the zeros do not take part in reconstruction of a volumetric representation (e.g., the point cloud 600). In contrast, an occupancy value of one, depicted as occupancy 713, represents that a portion of the bounding box 601 is occupied by one of the patches 603. Those portions of the bounding box 601 represented by the ones do take part in reconstruction of the volumetric representation (e.g., the point cloud 600). An occupancy frame 710 may be formally defined as a collection of occupancy values that constitute a 2D array and represents the entire occupancy information for a single atlas frame. Accordingly, occupancy frame 710 may indicate, for each sample position in the atlas, whether that position corresponds to a valid 3D point in the point cloud representation.

The various patches created by projecting 3D information onto 2D planes can be packed into a rectangular (or square) video frame. This approach may be advantageous because various video codecs, such as AVC, HEVC, and VVC are preconfigured to code such video frames. As such, the PCC codec can employ other video codecs to code the patches. As shown in FIG. 7A, the patches can be packed into a frame. The patches may be packed by any algorithm. For example, the patches can be packed into the frame based on size. In a particular example, the patches are included from largest to smallest. The largest patches may be placed first in any open space, with smaller patches filling in gaps once a size threshold has been crossed. As shown in FIG. 7A, such a packing scheme results in blank space that does not include patch data. To avoid encoding blank space, an occupancy frame 710 is employed. An occupancy frame 710 contains all occupancy data for a point cloud at a particular instant in time. Specifically, the occupancy frame 710 contains one or more occupancy values (also known as occupancy data, occupancy information, and/or occupancy components). An occupancy 713 and/or 715 can be implemented as a 2D array corresponding to an atlas 733 (group of patches) whose values indicate, for each sample position in the atlas 733, whether that position corresponds to a valid 3D point in the point cloud representation. As shown in FIG. 7A, the occupancy frame 710 includes areas of valid data depicted as occupancy 713. The areas of valid data indicate that atlas 733/patch data is present in corresponding locations in the occupancy frame 710. The occupancy frame 710 also include areas of invalid data depicted as occupancy 715. The areas of invalid data indicate that atlas 733/patch data is not present in corresponding locations in the occupancy frame 710.

FIG. 7B illustrates an example geometry frame 720 associated with a set of patches, such as patches 603. The geometry frame 720, also known as a geometry map, provides or depicts the contour or topography of each of the patches 603. Specifically, the geometry frame 720 indicates the distance that each point in the patches 603 is away from the planar surface (e.g., the 2D rectangular frame 602) of the bounding box 601. The geometry frame 720 contains geometry 723. Geometry 723 can be defined as a set of cartesian coordinates associated with a volumetric frame. A volumetric frame is set of 3D points specified by cartesian coordinates and zero or more corresponding sets of attributes at a particular time instance. Accordingly, a volumetric frame is a combination of an occupancy frame 710, a geometry frame 720, an atlas frame 730, and optionally one or more attribute frames describing a point cloud at a specified instant. For example, geometry 723 can describe the location of each point in a 3D bounding box at a corresponding instant in time.

As noted above, the geometry frame 720 contains geometry 723, also known as geometry maps, geometry data, geometry information, and/or geometry components) for a point cloud at a particular instant in time. A geometry 723 may be implemented as a 2D array created through the aggregation of the geometry information associated with each patch, where geometry information/data is a set of Cartesian coordinates associated with a point cloud frame. Specifically, the patches are all projected from points in 3D space. Such projection has the effect of removing the 3D information from the patches. The geometry 723 retains the 3D information removed from the patches. For example, each sample in a patch is obtained from a point in 3D space. Accordingly, the geometry frame 720 may include a 3D coordinate associated with each sample in each patch. Hence, the geometry frame 720/geometry 723 can be used by a decoder to map/convert the 2D patches back into 3D space to reconstruct the 3D point cloud. Specifically, the decoder can map each patch sample onto the appropriate 3D coordinate to reconstruct the point cloud.

FIG. 7C illustrates an example atlas frame 730 associated with a set of patches, such as patches 603. The atlas frame 730 provides or depicts samples of the patches 603 in the bounding box 601. The atlas frame 730 may be formally defined as a collection of two-dimensional (2D) bounding boxes (also known as patches and/or atlas 733) projected into rectangular frames that correspond to a volume in 3D space, known as a 3D bounding box, upon which volumetric data is rendered. The atlas frame 730 may include, for example, a color component and/or luminance component, of the points in the patches 603. The color component may be based on the RGB color model, the YUV color model, or based on another known color model. The occupancy frame 710, geometry frame 720, and atlas frame 730 can be employed to code a point cloud 600 and/or point cloud media 500. As such, the occupancy frame 710, geometry frame 720, and atlas frame 730 may be coded by an encoder, such as codec system 200 and/or encoder 300, and reconstructed by a decoder, such as codec system 200 and/or decoder 400, when performing method 100.

As noted above, the atlas frame 730 contains one or more atlas 733 (also known as atlas data, atlas information, atlas components, and/or patches) for a point cloud at a particular instant in time. An atlas 733 is a collection of 2D bounding boxes projected into rectangular frames that correspond to a 3D bounding box in 3D space, where each 2D bounding box/patch represents a subset of a point cloud. Specifically, the atlas 733 contains patches created when the 3D point cloud is projected into 2D space as described with respect to FIG. 6. As such, the atlas 733/patches contain the image data (e.g., the color and light values) associated with the point cloud at a corresponding instant in time. The atlas 733 corresponds to the occupancy frame 710 of FIG. 7A and the geometry frame 720 of FIG. 7B. Specifically, the atlas 733 contains data in areas of valid data according to occupancy 713, and does not contain data in the areas of invalid data according to occupancy 715. Further, the geometry 723 contains the 3D information for the samples in the atlas 733.

It should also be noted that a point cloud can contain attributes (also known as attribute data, attribute information, and/or attribute components). Such attributes can be included in an attribute frame. An attribute may contain all data regarding a corresponding attribute of the point cloud at a particular instant in time. An example of an attribute frame is not shown as attributes may include a wide range of different data. Specifically, an attribute may be any scalar or vector property associated with each point in a point cloud such as reflectance, surface normal, time stamps, material IDs, etc. Further, attributes are optional (e.g., user defined), and may vary based on application. However, when used, the point cloud attributes may be included in an attribute frame in a manner similar to the atlas 733, geometry 723, and occupancy.

Accordingly, an encoder can compress a point cloud frame into an atlas frame 730 of atlas 733, a geometry frame 720 of geometry 723, an occupancy frame 710 of occupancy 713 and 715 values, and optionally an attribute frame of attributes (collectively a volumetric frame). The atlas frame 730, geometry frame 720, occupancy frame 710, and/or attribute frame can be further compressed, for example by different encoders for transmission to a decoder. The decoder can decompress the atlas frame 730, geometry frame 720, occupancy frame 710, and/or attribute frame. The decoder can then employ the atlas frame 730, geometry frame 720, occupancy frame 710, and/or attribute frame to reconstruct the point cloud frame to determine a reconstructed point cloud at a corresponding instant of time. The reconstructed point cloud frames can then be included in sequence to reconstruct the original point cloud sequence (e.g., for display and/or for use in data analysis). As a particular example, the atlas frame 730 and/or atlas 733 may be encoded and decoded by employing the techniques described with respect to FIGS. 1-4, for example by employing a VVC, HEVC, and/or AVC codec.

Figure 8:
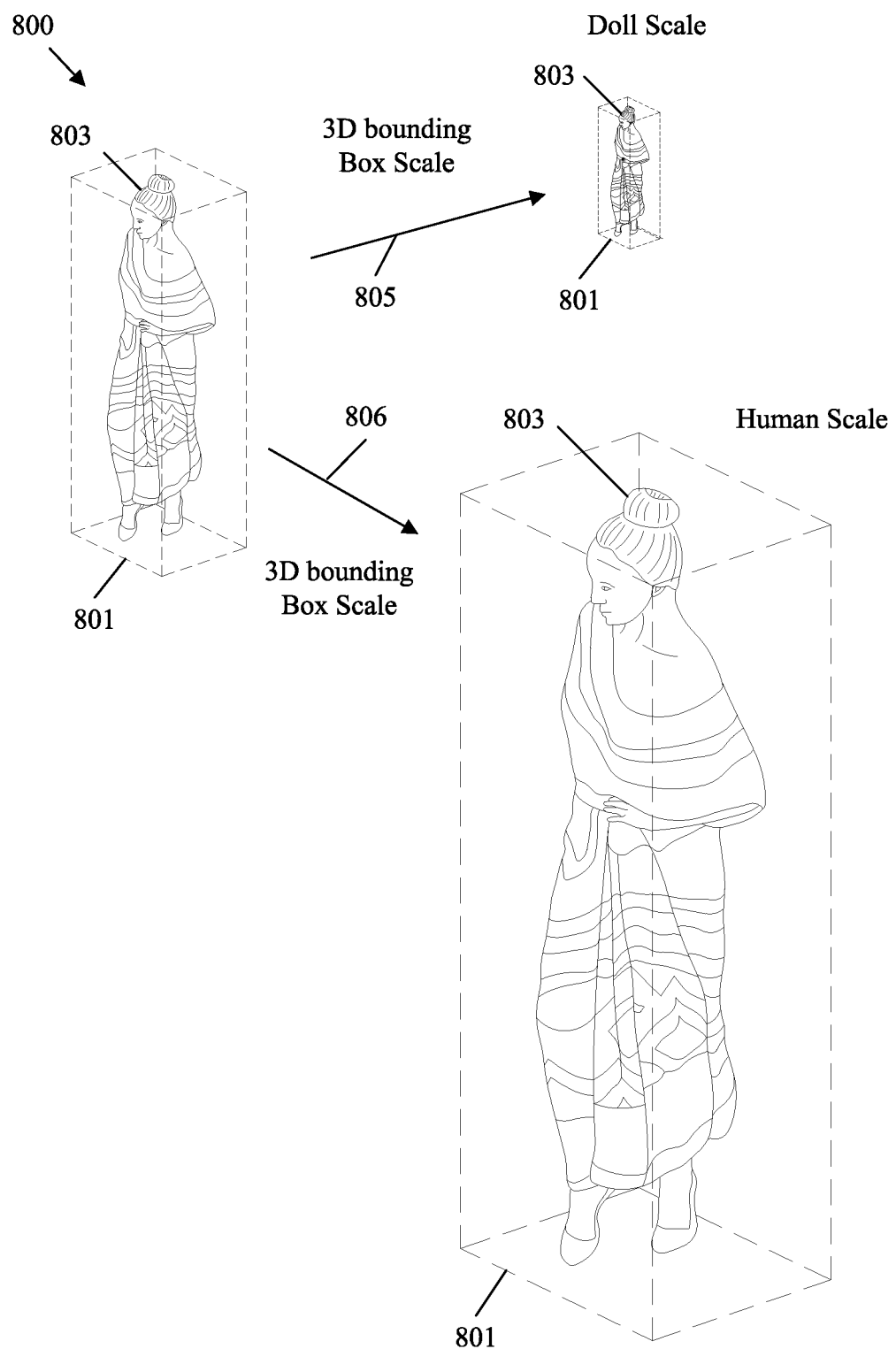
FIG. 8 is an example mechanism for scaling a reconstructed point cloud by scaling a corresponding 3D bounding box.

FIG. 8 is an example mechanism 800 for scaling a reconstructed point cloud by scaling a corresponding 3D bounding box 801. For example, a point cloud, such as point cloud media 500, can be reconstructed in a 3D bounding box 801, which may be substantially similar to 3D bounding box 501 and/or 601. As a specific example, a set of patches 603 can be decoded from an occupancy frame 710, a geometry frame 720, an atlas frame 730, and/or an attribute frame. The patches can be projected onto points in the 3D bounding box 801 to reconstruct a point cloud. The 3D bounding box 801 can then be scaled prior to display. This causes the reconstructed point cloud, which is contained in the 3D bounding box 801, to also be scaled. As such, the mechanism 800 can be employed when implementing method 100, 1100, and/or 1200. Further, mechanism 800 can be employed by a codec system 200, an encoder 300, a decoder 400, and/or a and/or a video coding device 1000, for example when reconstructing a point cloud for error testing at an encoder or for display at a decoder. Further, the mechanism 800 can be signaled by a PCC bitstream, such as V-PCC bitstream 900.

A point cloud can be reconstructed as a reconstructed point cloud 803 in a 3D bounding box 801 as described above. Specifically, geometry can be used to position points in the 3D bounding box 801. Occupancy can be employed to locate atlas/patches in an atlas frame. The atlas can be decoded and projected onto the points in the 3D bounding box 801. Any attributes from an attribute frame may also be applied. However, one problem with many PCC systems is the point clouds may be encoded and decoded as an arbitrary size. For example, some PCC systems may encode all point clouds as the same size. This approach forces a user to size the cloud appropriately upon display. This approach may be unworkable for augmented reality (AR) purposes.

For example, AR generally allows a user to employ a video recording device to record real time video. The AR system then overlays predetermined video content over the real time video and displays the result to the user. This creates the impression of fictional, technical, or other generated visual content that is overlaid onto video in the user's environment. An example AR device may include a smart phone, a tablet, a laptop computer, or other computing device with both a camera and a display. A point cloud of an arbitrary size may be unsuitable for such applications because the AR system may be unable to appropriately size the point cloud to fit into the real time video. In the example shown, the reconstructed cloud 803 depicts a human figure. As an example, the human figure could be displayed as a doll that takes up relatively little space in a scene or as a human sized figure that takes up a significant portion of the scene. Requiring the user to properly size the reconstructed cloud 803 may make the application cumbersome and/or unusable.

The present disclosure includes a 3D bounding box scale 805 and a 3D bounding box scale 806. A 3D bounding box scale 805/806 is a parameter that indicates a scale to be applied to the 3D bounding box 801 parameters that may be specified for an object, such as a reconstructed cloud 803. As an example, the 3D bounding box scale 805 may be a value that scales the 3D bounding box 801, and hence the contained reconstructed point cloud 803, to a smaller size, such as a doll scale. Further, the 3D bounding box scale 806 may be a value that scales the 3D bounding box 801, and hence the contained reconstructed point cloud 803, to a larger size, such as a human scale. This allows the reconstructed point cloud 803 to be sized correctly so that the reconstructed point cloud 803 can be overlaid onto real world video. The 3D bounding box scale 805/806 may be a factor based on a sample density of the reconstructed point cloud 803 in the 3D bounding box 801 and a size of the 3D bounding box 801. The 3D bounding box scale 805/806 may be expressed in meters in some examples. For example, a 3D bounding box scale 805/806 may be expressed as a value that indicates a sample density value of the reconstructed point cloud 803 divided by a 3D bounding box 801 size, or vice versa. The appropriate 3D bounding box scale 805/806 can determined by an encoder based on the intended size of the reconstructed point cloud 803. The 3D bounding box scale 805/806 selected by the encoder can be coded into a V-PCC bitstream as a parameter. The decoder can obtain the signaled 3D bounding box scale 805/806 from the V-PCC bitstream and scale the 3D bounding box 801 and the reconstructed point cloud 803 prior to rendering the reconstructed point cloud 803 for overlay and display with the real time video in an AR context. In other examples, the 3D bounding box scale 805/806 can also be used to scale any reconstructed point cloud 803 for use in other applications, for example for any display of a reconstructed point cloud 803 relative to a scene with sizing varying relative size.

Figure 9:
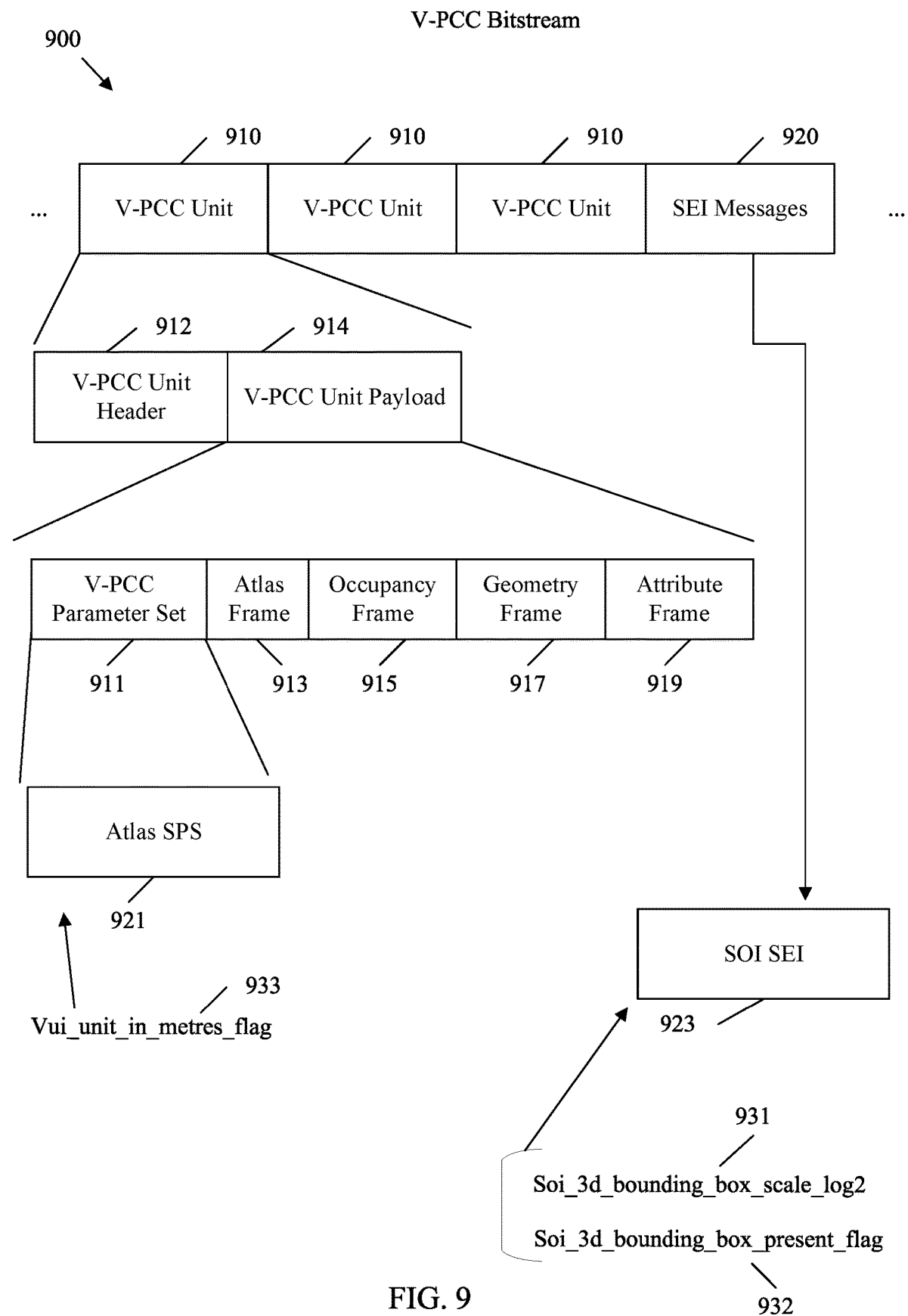
FIG. 9 is a schematic diagram illustrating an example video PCC (V-PCC) bitstream for use in scaling a point cloud.

FIG. 9 is a schematic diagram illustrating an example V-PCC bitstream 900 for use in scaling a point cloud. For example, the V-PCC bitstream 900 can be generated by a codec system 200 and/or an encoder 300 for decoding by a codec system 200 and/or a decoder 400 according to method 100. Further, the V-PCC bitstream 900 can be used to encode a set of patches 603 from a point cloud media 500 as an occupancy frame 710, a geometry frame 720, an atlas frame 730, and/or an attribute frame. In addition, the V-PCC bitstream 900 can encode a 3D bounding box scale 805/806 to support scaling at a decoder.

A V-PCC bitstream 900 comprises a series of V-PCC units 910 and supporting supplemental enhancement information (SEI) messages 920. A V-PCC unit 910 is a data container sized to be placed in a data packet for transmission toward a decoder. Specifically, a V-PCC unit 910 contains a V-PCC component that is relevant to one or more volumetric frames that represents a point cloud at a corresponding instant in a V-PCC video sequence. As a specific example, a V-PCC unit 910 may be configured as a network abstraction layer (NAL) unit corresponding to a versatile video coding (VVC) standard. A NAL unit is a packet sized data container. For example, a single NAL unit is generally sized to allow for network transmission. A NAL unit may contain a header indicating the NAL unit type and a payload that contains the associated data. A V-PCC unit 910 contains a V-PCC unit payload 914 and a V-PCC unit header 912. A V-PCC unit payload 914 contains a corresponding type of video data related to a volumetric frame. A V-PCC unit header 912 is header that indicates the type of data included in the A V-PCC unit payload 914.

A V-PCC unit payload 914 may contain a V-PCC parameter set 911, an atlas frame 913, an occupancy frame 915, a geometry frame 917, and/or an attribute frame 919, depending on the example. A V-PCC parameter set 911 is a group of parameters that describe settings used to code one or more corresponding volumetric frames. As an example, a V-PCC parameter set 911 may include an atlas sequence parameter set (SPS) 921. An atlas SPS 921 is a syntax structure containing syntax elements that apply to one or more entire coded atlas sequences. A V-PCC parameter set 911 may also include other parameter sets, such as atlas frame parameter sets, video-based visual volumetric coding (V3C) parameter sets, etc. The primary distinction between the parameter sets is whether the contained parameters relate to the V-PCC at a video level (e.g., V3C parameter set), a sequence level (e.g., atlas SPS), and/or a frame level (e.g., atlas frame parameter set). Other parameter sets may also be employed for particular purposes, and the preceding is not intended as an exhaustive list.

An atlas frame 913 is a collection of 2D bounding boxes/patches/atlases projected into rectangular frames that correspond to a volume in 3D space, known as a 3D bounding box, upon which volumetric data is rendered. An atlas frame 913 may be substantially similar to an atlas frame 730. An occupancy frame 915 is a collection of occupancy values that constitute a 2D array and represents the entire occupancy information for a single atlas frame. Occupancy are values that indicate whether atlas samples correspond to associated samples in 3D space. An occupancy frame 915 may be substantially similar to an occupancy frame 710. A geometry frame 917, also known as a geometry map, is a frame containing geometry patch information projected at a particular depth. A geometry is a set of cartesian coordinates associated with a volumetric frame. A geometry frame 917 may be substantially similar to a geometry frame 720. An attribute frame 919 is a frame that contains a scalar or vector property optionally associated with each point in a volumetric frame of a point cloud such as color, reflectance, surface normal, time stamps, material identifier (ID), etc. A volumetric frame is set of 3D points specified by cartesian coordinates and zero or more corresponding sets of attributes at a particular time instance. A video of a point cloud includes a series of volumetric frames. As such, the V-PCC parameter set 911 contains parameters indicating how one or more volumetric frames should be decoded and the atlas frame 913, occupancy frame 915, the geometry frame 917, and the attribute frame 919 contain the video data to reconstruct the volumetric frames.

The V-PCC bitstream 900 also includes various SEI messages 920. An SEI message is a syntax structure with specified semantics that conveys information that is not needed by decoding processes in order to determine the values of samples in decoded pictures. Accordingly, SEI messages may be employed to convey data that is not directly related to decoding V-PCC units 910. In the example shown, the V-PCC bitstream 900 includes a scene object information (SOI) SEI message 923. Other SEI messages may also be employed for particular purposes.

A SOI SEI message 923 is an SEI message that defines a set of objects that may be present in a volumetric scene, and optionally assigns different properties to these objects. These objects could then potentially be associated with different types of information, including patches and 2D volumetric rectangles that may be defined using the patch information and volumetric rectangle information SEI messages.

As noted above, some PCC systems do not contain data sufficient to size reconstructed point clouds based on real world measurements. The V-PCC bitstream 900 contains parameters sufficient to overcome these limitations. For example, the atlas SPS 921 may contain volumetric usability information (VUI) parameters. Specifically, the atlas SPS 921 may contain a VUI unit in meters flag (vui_unit_in_metres_flag) 933. A flag is a value that signals data for an associated function or process. A vui_unit_in_metres_flag 933 is a flag that indicates whether coordinate data for a point cloud is expressed in meters. In a specific example, a vui_unit_in_metres_flag 933, when equal to one, specifies that the real-world coordinates information is expressed in meters. Further, a vui_unit_in_metres_flag 933, when equal to zero, specifies that the world coordinates are unitless.

Further, the SOI SEI message 923 may comprise a 3D bounding box scale, which may be denoted as SOI 3D bounding box scale log2 (soi_3d_bounding_box_scale_log2) 931. The soi_3d_bounding_box_scale_log2 931 is a parameter that indicates a scale to be applied to the 3D bounding box parameters that may be specified for an object. For example, a volumetric frame of a point cloud can be reconstructed into a 3D bounding box using data from an atlas frame 913, an occupancy frame 915, a geometry frame 917, and/or an attribute frame 919. This results in one or more point clouds with arbitrary unitless sizes that is/are described by a local coordinate system, such as a cartesian coordinate system. The scale from the soi_3d_bounding_box_scale_log2 931 can then be applied as a transform. For example, the soi_3d_bounding_box_scale_log2 931 can be applied to transform the local coordinate system to a final target 3D coordinate system that describes objects in real-world size. This allows the reconstructed point cloud to be sized correctly so that the reconstructed point cloud can be overlaid onto real world video (e.g., without significant additional processing by a corresponding application at a decoder and/or without user intervention at the decoder). The soi_3d_bounding_box_scale_log2 931 may be a factor based on a sample density in the 3D bounding box and a size of the 3D bounding box. For example, the soi_3d_bounding_box_scale_log2 931 may correlate the number of spatial units in a point cloud frame and a step size value defined based on spatial frequency in the 3D bounding box. As a specific example, the soi_3d_bounding_box_scale_log2 931 may indicate a number of steps and a step size (e.g., in meters) that is equal to a quotient of desired spatial frequency divided by a number of spatial units in the point cloud frame. As a further example, when the spatial rate of a point cloud frame signal is one $m^{-1}$, the number of spatial units may be equal to one thousand and the spatial frequency may be equal to one million, which results in a step size of one millimeter.

The SOI SEI message 923 may also comprise a SOI 3D bounding box present flag (soi_3d_bounding_box_present_flag) 932. The soi_3d_bounding_box_present_flag 932 can be set to indicate whether the soi_3d_bounding_box_scale_log2 931 is contained in the SOI SEI message 923. For example, the soi_3d_bounding_box_present_flag 932 can be set equal to one to indicate that 3D bounding box information is present in the current scene object information SEI message. Further, the soi_3d_bounding_box_present_flag 932 can be set equal to zero to indicate that 3D bounding box information is not present. As such, the decoder can reconstruct the point cloud in the 3D bounding box, check the soi_3d_bounding_box_present_flag 932 to determine that the soi_3d_bounding_box_scale_log2 931 is present, obtain the parameters from the soi_3d_bounding_box_scale_log2 931, and scale the 3D bounding box and reconstructed point cloud to a real-world size, for example in units of meters. A renderer at the decoder can then render the scaled point cloud by converting the 3D cloud into a 2D perspective for display on a screen, overlay the rendered point cloud onto recorded/real-time/real-world video, and then display the combined video and point cloud representation as AR video. Hence, the present example increases functionality at both an encoder and decoder by creating AR support. Further, the present disclosure supports mechanisms to increase coding efficiency, and hence supports a reduction in processor, memory, and/or network resource usage at an encoder and/or a decoder.

A specific implementation of the preceding information is now described in more detail herein below. Point cloud may be an integral part of a wide variety of applications including the entertainment industry, intelligent automobile navigation, geospatial inspection, 3D modelling of real-world objects, visualization etc. Considering the non-uniform sampling geometry of point clouds, the creation of compact representations for storage and transmission of such data may be beneficial. Compared with the other 3D presentations, the irregular point cloud may be more general and applicable for a wider range of sensors and data acquisition strategies. For example, for 3D presentation in the virtual reality world or remote rendering in telepresence environments, the rendering of virtual figures and real-time instructions may be processed as a dense point cloud data set. This type of content may be used as immersive six degrees of freedom, dynamic augmented/virtual reality objects, cultural heritage, graphic information system mapping, computer aided design and drafting, autonomous navigation, etc.

A dynamic point cloud sequence represents a sequence of point cloud frames. A V-PCC codec solution is based on segmentation of a 3D point cloud data into a set 3D patches, represented by the 3D bounding box (Patch3dPosX, Patch3dPosY, Patch3dPosMinZ and the normal axis indication—PatchAxisZ), and following orthographic projection onto the plane to obtain a set of 2D projection patches with a 2D bounding box (Patch2dPosX, Patch2dPosY, Patch2dSizeX, Patch2dSizeY). As such, V-PCC employs a combination of 3D bounding box information and 2d bounding box information.

Thus, a set of 3D points in the point cloud frame is iterated, segmented based on the definition of smooth continuous surface criteria into the 3D patches, and projected onto the sides of the bounding box sides, forming the 2D patches. The collection of patches creates a patch tile group, where patch tile groups are combined in the atlas data for a given point cloud frame. Each element of the atlas data may be referred to as a patch, has a specific and unique index, and corresponds to a unique 3D bounding box within the 3D point cloud frame. Moreover, if the patch in a point cloud frame has a correspondent reference patch in the reference point cloud frame, an index of the reference patch in the reference patch tile group should be transferred in the bitstream.

A representation of the V-PCC unit payload that describes a point cloud time series may include an occupancy video data frame (2D frame), an attribute video data frame (2×2D frames: near and far layers), a geometry video data frame (2×2D frames: near and far layers), and/or atlas data. The atlas data may be a 1× set of patches T(i,0)~T(i,m), may include the information to reconstruct a point cloud frame from the occupancy, attribute, and geometry components of the V-PCC Unit payload where i is a atlas data index that correspond to a 3D PCC frame, where i m+1 is the number of 3D patches generated for the 3d point cloud frame i, and where T(i,j) is referred as a patch.

Patches may be predicted by reference to a reference frame/data unit from a current data unit. The prediction between near and far layer may be allowed only within the same V-PCC frame. The process of obtaining one single 2D patch from the corresponding 3D bounding box within the point cloud frame is as follows. A 3D point cloud frame is decomposed into independent 3D patches, that represent the 3d information, which is defined by the bounding box in 3D space. A projection plane, as one of the sides of the 3D bounding box for the point cloud, is defined for each of the 3D patches. For instance, the criteria for selecting a projection plane may be that the area of the projected 3D patch is maximal among all the candidates. The normal axis for the patch (PatchAxisZ) may be defined to be orthogonal to the projection plane. The tangent and bitangent axis may be defined to create a right-hand 3d coordinate system. Corresponding values for a patch data frame element with index patchIdx as Patch3dPosX, Patch3dPosY, Patch3dPosMinZ that describe the 3D location of the 3D patch, and Patch2dPosX, Patch2dPosY, Patch2dSizeX, Patch2dSizeY that describe 2D coordinates of the 2D projection of the patch may be stored in the corresponding element of the atlas data v-pcc unit.

UV mapping is the 3D modelling process of converting a 2D projection to a 3D patch surface for texture mapping. The letters U and V denote the axes of the 2D projection. The letters X, Y and Z denote the 3d coordinates of the 3d patch bounding box.

Volumetric usability information (VUI) may be used to define an aspect relating to a point cloud rendering in the real world. For instance, such information may provide a temporal sampling rate that would determine the duration of the frame. In immersive applications there is a common use case where the point cloud represents a real physical object and should be rendered in the real world. However, some V-PCC systems employ no information indicating the physical dimensions of the sample (3-dimensional pixel) in the real world in the V-PCC bitstream.

To provide the scaling information in the V-PCC bitstream a VUI parameters indicating the scaling for the point cloud frame sample are introduced in the following format. The block defines a physical representation of a single occupied sample of the 3-dimensional grid that represents discrete point cloud frame. The block physical dimension is expressed as step size:

$$SizeStep = vui\_num\_units\_in\_block \div vui\_block\_scale$$

The parameters defined in this equitation can be carried in the VUI syntax structure with corresponding changes as follows.

| | Descriptor |
|---|---|
| vui_parameters( ) { | |
|   vui_timing_info_present_flag | u(1) |
|   if( vui_timing_info_present_flag ) { | |
|     vui_num_units_in_tick | u(32) |
|     vui_time_scale | u(32) |
|     vui_poc_proportional_to_timing_flag | u(1) |
|     if( vui_poc_proportional_to_timing_flag ) | |
|       vui_num_ticks_poc_diff_one_minus1 | ue(v) |
|     vui_hrd_parameters_present_flag | u(1) |
|     if( vui_hrd_parameters_present_flag ) | |
|       hrd_parameters( ) | |
|   } | |
|   vui_scaling_info_present_flag | u(1) |
|   if(vui_scaling_info_present_flag ) { | |
|     vui_num_units_in_block | u(32) |
|     vui_block_scale | u(32) |
|   } | |
| } | |

For example, the semantics of these elements may be as follows. vui_scaling_info_present_flag, when equal to one, specifies that vui_num_units_inblock and vui_block_scale are present in the vui_parameters( ) syntax structure. vui_scaling_info_present_flag, when equal to zero, specifies that vui_num_units_in_block and vui_block_scale are not present in the vui_parameters( ) syntax structure. When vui_scaling_info_present_flag may be inferred to be equal to zero when not present in the bitstream. vui_num_units_in_block is the number of spatial units of a size operating at the spatial frequency vui_time_scale_m$^{-1}$ that corresponds to one increment (called a size step) of a size step counter. vui_num_units_inblock shall be greater than zero. A size step, in units of m, is equal to the quotient of vui_num_units_in_block divided by vui_block_scale. For example, when the spatial rate of a poin cloud frame signal is 1 m$^{-1}$, vui_time_scale may be equal to 1,000 and vui_num_units_inblock may be equal to 1,000,000 and consequently a size step may be equal to 0.001 m or 1 mm. vui_block_scale is the number of spatial units that pass in one point cloud frame. For example, a spatial coordinate system that measures distance using a one m$^{-1}$ spatial frequency has a vui_block_scale of one. The value of vui_block_scale should be greater than zero.

The VUI parameters that carry sample physical dimension in 3D space are introduced in the bitstream to allow near instantaneous and precise placement of the augmented object in a real scene. Existing solutions does not provide such information. Otherwise, the scaling information may be derived based on the content type and application, however the results of the scaling are not accurate. As such, the VUI parameters are added that represent scaling information of the point cloud sample in the real world. The block size is expressed in a form of units per block (num_units_in_block) and scaling factor (vui_block_scale) that allow flexible range of the scale factors expressed in the integer form. Further, the additional VUI parameters flag that enables or disables the scaling parameter for the point cloud block. If the scaling parameters are not present in the point cloud the block size is inferred to be one millimeter (mm).

Figure 10:
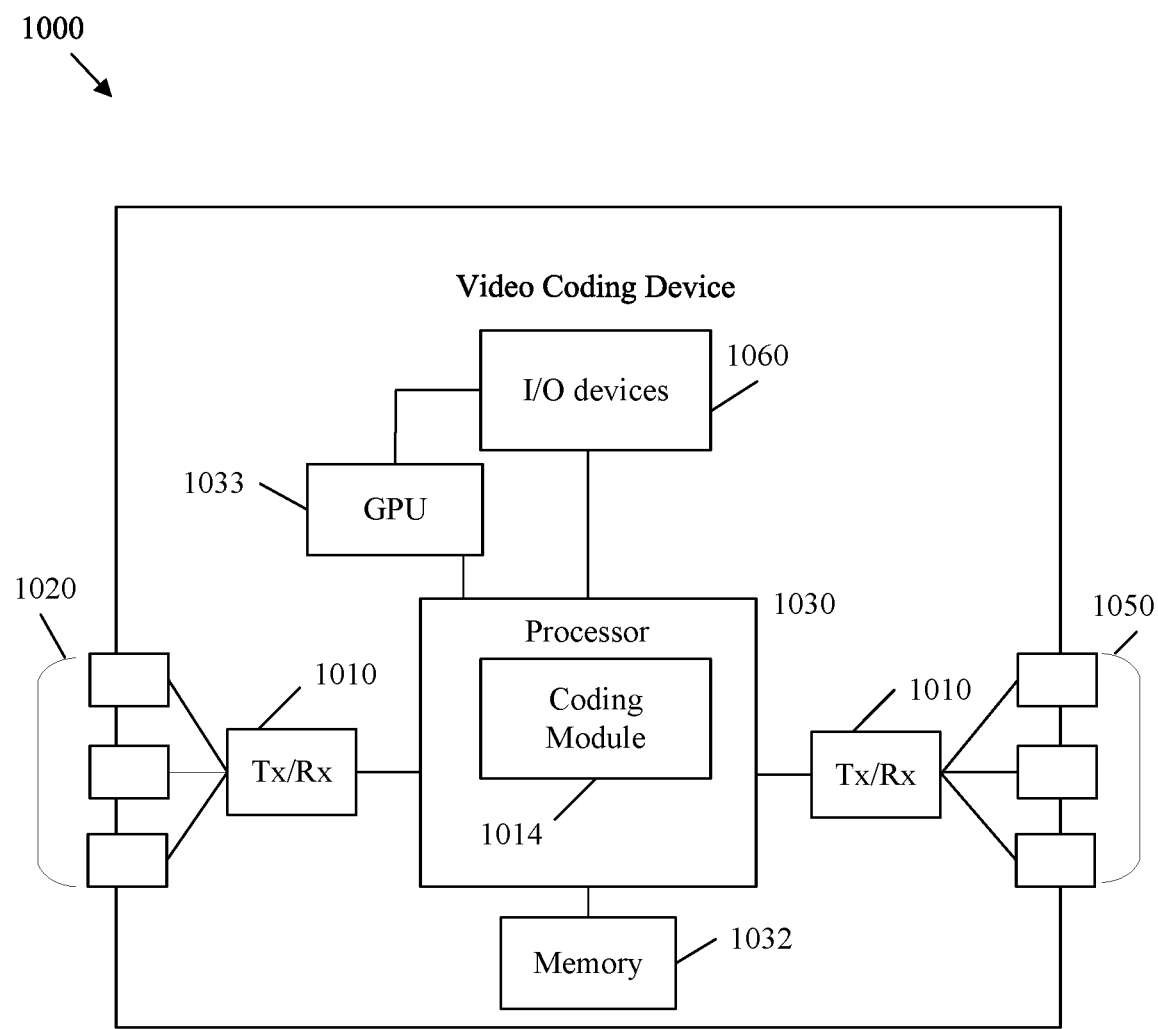
FIG. 10 is a schematic diagram of an example video coding device.

FIG. 10 is a schematic diagram of an example video coding device 1000. The video coding device 1000 is suitable for implementing the disclosed examples/embodiments as described herein. The video coding device 1000 comprises downstream ports 1020, upstream ports 1050, and/or transceiver units (Tx/Rx) 1010, including transmitters and/or receivers for communicating data upstream and/ or downstream over a network. The video coding device 1000 also includes a processor 1030 including a logic unit and/or central processing unit (CPU) to process the data and a memory 1032 for storing the data. The video coding device 1000 may also comprise electrical, optical-to-electrical (OE) components, electrical-to-optical (EO) components, and/or wireless communication components coupled to the upstream ports 1050 and/or downstream ports 1020 for communication of data via electrical, optical, or wireless communication networks. The video coding device 1000 may also include input and/or output (I/O) devices 1060 for communicating data to and from a user. The I/O devices 1060 may include output devices such as a display for displaying video data, speakers for outputting audio data, etc. The I/O devices 1060 may also include input devices, such as a keyboard, mouse, trackball, etc., and/or corresponding interfaces for interacting with such output devices. The video coding device 1000 may also include a graphics processing unit (GPU) 1033, which is a specialized processor configured to process video data. The GPU 1033 may contain internal memory and/or may process data directly from CPU memory.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the downstream ports 1020, Tx/Rx 1010, upstream ports 1050, and memory 1032. The processor 1030 comprises a coding module 1014. The coding module 1014 implements the disclosed embodiments described herein, such as methods 100, 1100, and 1200, which may employ point cloud media 500 separated into a set of patches 603 and encoded into an occupancy frame 710, a geometry frame 720, and an atlas frame 730 in a V-PCC bitstream 900. The coding module 1014 may also implement mechanism 800 and any other method/mechanism described herein. Further, the coding module 1014 may implement a codec system 200, an encoder 300, and/or a decoder 400. For example, a coding module 1014 at an encoder can encode a 3D bounding box scale and/or a flag indicating the presence of the 3D bounding box scale into a V-PCC bitstream. Further, a coding module 1014 at decoder can then use the 3D bounding box scale to scale the 3D bounding box and the point cloud contained in the 3D bounding box. This allows the encoder to specify a real-world size for the point cloud (e.g., in meters). The decoder can then scale the point cloud to the proper real-world size, for example to overlay onto other video data. Hence, coding module 1014 causes the video coding device 1000 to provide additional functionality and/or coding efficiency when coding video data. As such, the coding module 1014 improves the functionality of the video coding device 1000 as well as addresses problems that are specific to the video coding arts. Further, the coding module 1014 effects a transformation of the video coding device 1000 to a different state. Alternatively, the coding module 1014 can be implemented as instructions stored in the memory 1032 and executed by the processor 1030 (e.g., as a computer program product stored on a non-transitory medium).

The memory 1032 comprises one or more memory types such as disks, tape drives, solid-state drives, read only memory (ROM), random access memory (RAM), flash memory, ternary content-addressable memory (TCAM), static random-access memory (SRAM), etc. The memory 1032 may be used as an over-flow data storage device, to store programs when such programs are selected for execution, and to store instructions and data that are read during program execution.

Figure 11:
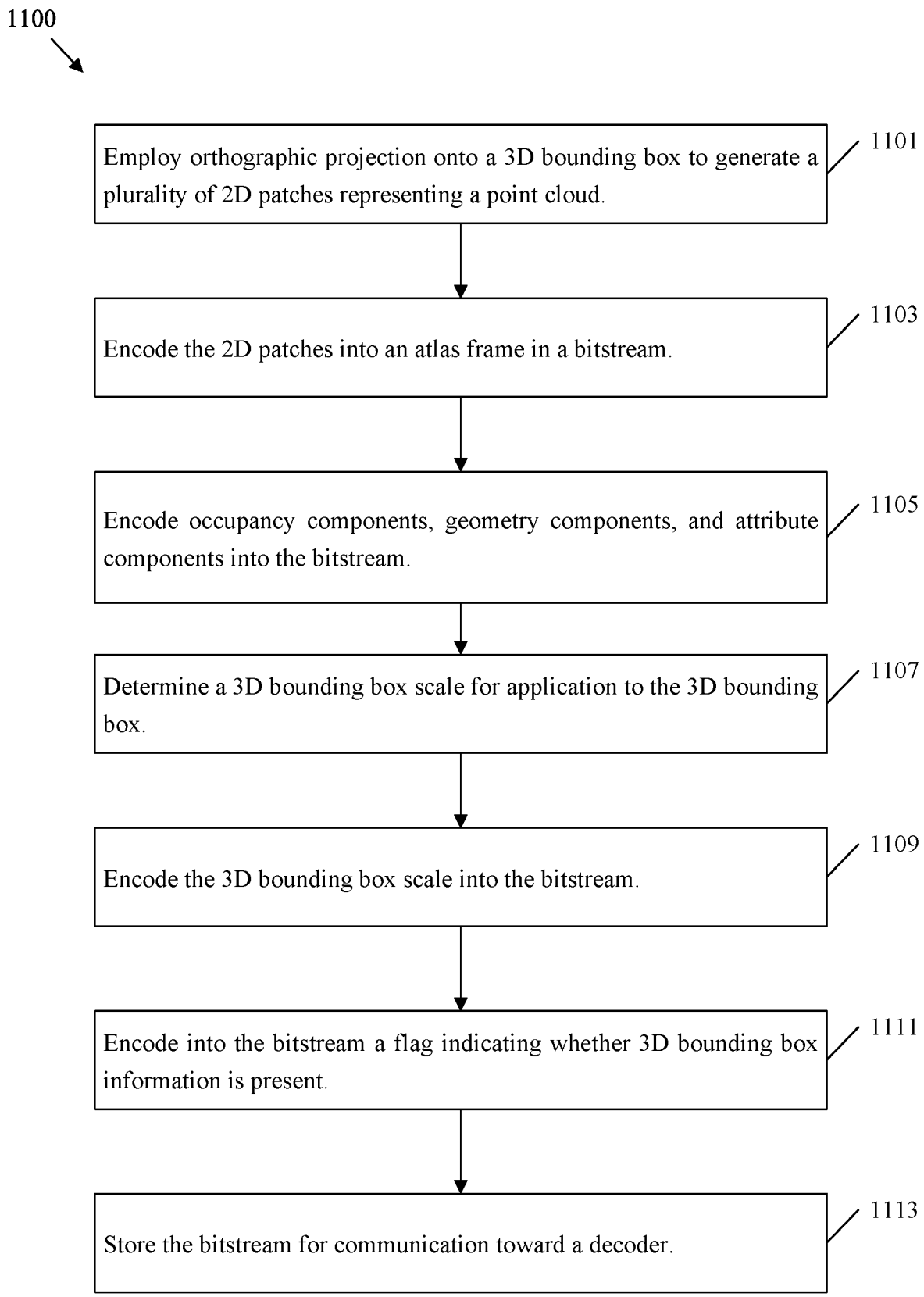
FIG. 11 is a flowchart of an example method of encoding a PCC bitstream to support scaling a point cloud upon reconstruction.

FIG. 11 is a flowchart of an example method 1100 of encoding a PCC bitstream, such as V-PCC bitstream 900, to support scaling a point cloud upon reconstruction, for example according to mechanism 800. Method 1100 may be employed by an encoder, such as a codec system 200, an encoder 300, and/or a video coding device 1000 when performing method 100. As such, the method 1100 may operate on point cloud media 500, which is separated into a set of patches 603 and encoded into an occupancy frame 710, a geometry frame 720, an atlas frame 730, and/or an attribute frame.

Method 1100 may begin when an encoder receives a video sequence including a point cloud. Specifically, the point cloud is represented in a sequence of volumetric frames, which depict the point cloud and any changes to the point cloud over time. The encoder then determines to encode that video sequence into a V-PCC bitstream, for example based on user input. At step 1101, the encoder employs an orthographic projection to project the point cloud for a volumetric frame onto the 2D faces of a 3D bounding box. Such 2D faces may be referred to as 2D bounding boxes. The projection generates a plurality of 2D patches representing a point cloud from different perspectives.

At step 1103, the encoder encodes the 2D patches into an atlas frame and encodes the atlas frame into a V-PCC bitstream. The patches may also be referred to as atlas, atlas information, atlas video data, atlas components, etc. The atlas/patches include 2D projections of the luma and/or chroma components of the point cloud. In a specific example, the patches may be packed into the atlas frame. This positions the patches into a square/rectangular frame that can be easily encoded by various standardized encoders, such as VVC, AVC, HEVC, etc. However, due to the irregular nature of the patches, the patches generally leave blank spaces in the atlas frame. As such, the atlas frame contains sections without video data.

Accordingly, the encoder generates and encodes an occupancy frame of occupancy into the V-PCC bitstream at step 1105. The occupancy can also be referred to as occupancy information, occupancy data, occupancy components, etc. The occupancy components inform the decoder which samples in the atlas frame are associated with video data. As used herein, a sample is any portion of video data that describes one or more points in a point cloud. The encoder also determines and encodes a geometry frame of geometry into the V-PCC bitstream at step 1105. The geometry can also be referred to as geometry information, geometry data, geometry components, etc. The geometry components contain information indicating a location of the samples/points in 3D space. Further, the points in the point clouds may be associated with one or more attributes. An attribute may be a scalar or vector property optionally associated with each point in a volumetric frame of a point cloud such as color, reflectance, surface normal, time stamps, material ID, etc. The encoder may optionally also determine and encode an attribute frame of attributes into the V-PCC bitstream at step 1105. The attributes may also be referred to as attribute information, attribute data, attribute components, etc. The attribute components provide properties of the samples.

At step 1107, the encoder can determine a scale for application to the point cloud (or portion thereof). For example, the encoder can determine a 3D bounding box scale for application to the 3D bounding box. For example, the 3D bounding box scale may include parameters to rescale samples in the 3D bounding box from a local coordinate system to a real-world size. The 3D bounding box scale may indicate a scale to be applied to the 3D bounding box parameters that may be specified for an object. For example, a volumetric frame of a point cloud can be reconstructed into a 3D bounding box using data from an atlas frame, an occupancy frame, a geometry frame, and/or an attribute frame. This results in one or more point clouds that are encoded with arbitrary unitless sizes according to a local coordinate system, such as a cartesian coordinate system. The 3D bounding box scale may be implemented as a transform that can be applied to scale the entire point cloud in the bounding box by transforming the local coordinate system to a final target 3D coordinate system that describes objects in real-world size. This allows the point cloud as reconstructed at the decoder to be sized correctly so that the reconstructed point cloud can be overlaid onto real world video (e.g., without significant additional processing by a corresponding application at a decoder and/or without user intervention at the decoder). The 3D bounding box scale may be a factor based on a sample density in the 3D bounding box and a size of the 3D bounding box. For example, the 3D bounding box scale may correlate the number of spatial units in a point cloud frame and a step size value defined based on spatial frequency in the 3D bounding box. As a specific example, the 3D bounding box scale may indicate a number of steps and a step size (e.g., in meters) that is equal to a quotient of desired spatial frequency divided by a number of spatial units in the point cloud frame.

The encoder can encode the 3D bounding box scale into the V-PCC bitstream at step 1109. In some cases, the 3D bounding box scale may be encoded into the V-PCC bitstream as a soi_3d_bounding_box_scale_log2 parameter in a SOI SEI message. In an example, the 3D bounding box may be scaled in units of meters. Accordingly, the encoder can also encode a flag to indicate whether the 3D bounding box is sized in meters. In a specific example, the flag may be a vui_unit_in_metres_flag encoded into an atlas SPS in the V-PCC bitstream. The vui_unit_in_metres_flag may be set equal to one to specify that the real-world coordinates information is expressed in meters or set equal to zero to specify that the world coordinates are unitless.

At step 1111, the encoder can encode a flag into the V-PCC bitstream to indicate whether 3D bounding box information is present in the V-PCC bitstream. For example, a value of the flag can indicate whether to apply the 3D bounding box scale to the 3D bounding box. As a specific example, the flag can be encoded as a soi_3d_bounding_box_present_flag. The soi_3d_bounding_box_present_flag can indicate whether the soi_3d_bounding_box_scale_log2 is encoded in the SOI SEI message in the V-PCC bitstream. In a specific example, the soi_3d_bounding_box_present_flag can be set equal to one to indicate that 3D bounding box information is present in the current SOI SEI message or can be set equal to zero to indicate that 3D bounding box information is not present in the SOI SEI message.

At step 1113, the encoder can store the bitstream for communication toward a decoder. The encoder can also transmit the bitstream toward a decoder upon request and/or to an intermediate content server for storage as desired. As such, the method 1100 encodes sufficient information into a V-PCC bitstream to indicate to a decoder whether to scale a point cloud and how to perform such a scaling, for example to be used in conjunction with real world sized video (e.g., in AR).

Figure 12:
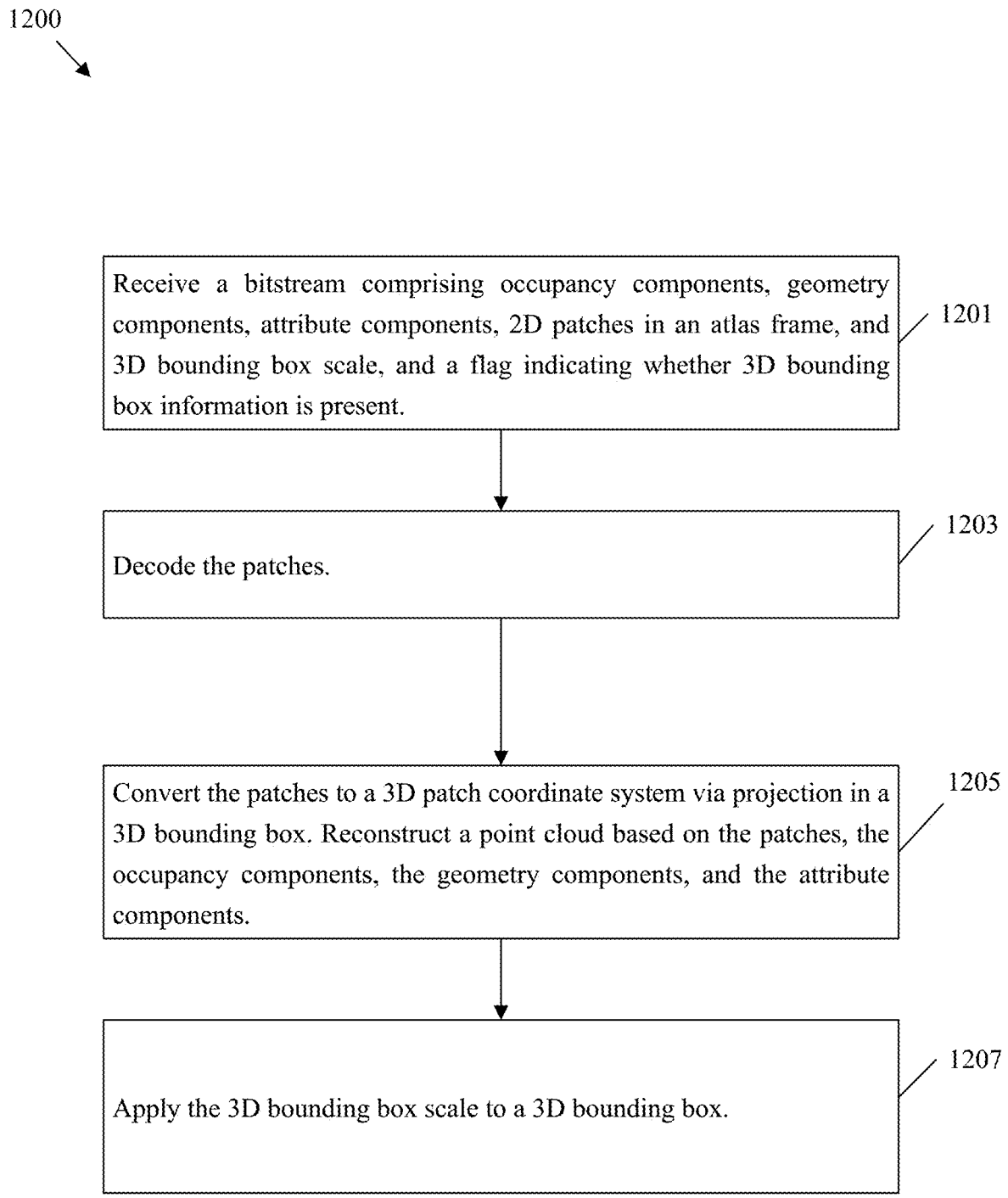
FIG. 12 is a flowchart of an example method of decoding a PCC bitstream to reconstruct a scaled point cloud.

FIG. 12 is a flowchart of an example method 1200 of decoding a PCC bitstream, such as V-PCC bitstream 900, to reconstruct a scaled point cloud, for example according to mechanism 800. Method 1200 may be employed by a decoder, such as a codec system 200, a decoder 400, and/or a video coding device 1000 when performing method 100. As such, the method 1200 may operate on point cloud media 500, which is separated into a set of patches 603 and encoded into an occupancy frame 710, a geometry frame 720, an atlas frame 730, and/or an attribute frame.

Method 1200 may begin when a decoder begins receiving a V-PCC bitstream of coded data representing a video sequence of point clouds, for example as a result of method 1100. At step 1201, the decoder can receive the V-PCC bitstream. The bitstream may comprise a plurality of 2D patches/2D components/atlas in an atlas frame. The bitstream may also comprise occupancy, geometry, and/or attributes in occupancy frames, geometry frames, and attribute frames, respectively. The occupancy can also be referred to as occupancy information, occupancy data, occupancy components, etc. The occupancy components inform the decoder which samples in the atlas frame are associated with video data. As used herein, a sample is any portion of video data that describes one or more points in a point cloud. The geometry can also be referred to as geometry information, geometry data, geometry components, etc. The geometry components contain information indicating a location of the samples/points in 3D space. Further, the points in the point clouds may be associated with one or more attributes. An attribute may be a scalar or vector property optionally associated with each point in a volumetric frame of a point cloud such as color, reflectance, surface normal, time stamps, material ID, etc. The attributes may also be referred to as attribute information, attribute data, attribute components, etc. The attribute components, when present, provide properties of the samples. The V-PCC bitstream may also comprise a 3D bounding box scale, a flag indicating whether 3D bounding box information is present, and/or a flag indicating that units for a point cloud are in meters.

At step 1203, the patches are decoded. For example, the decoder can decode the patches/atlas by employing inter-prediction based on reference frames and/or intra-prediction based on blocks in the same frame.

At step 1205, the point cloud is reconstructed by converting the patches to a 3D patch coordinate system via projection in a 3D bounding box. This may be accomplished by converting the patches from a local coordinate system to 3D patch coordinate system defined by each projection plane (e.g., each of the six sides) of the 3D bounding box. In some examples, the 3D patch coordinate system can be transformed to a target 3D coordinate systems that employs units of meters to operate in conjunction with a real world space. Such decoding and reconstruction can be performed by employing the occupancy components, geometry components, and attribute components. For example, the decoder can employ the occupancy to determine which portions of the atlas frame contain video data. Those portions of the atlas frame can be decoded to obtain the atlas/patches. The geometry from the geometry frame can be employed to position points inside the 3D bounding box. The patches/atlas can then be projected onto the points in the 3D bounding box. Attributes, when present in an attribute frame, can also be applied to such points At step 1207, the 3D bounding box scale is applied to the 3D bounding box and all included points, for example based on a value of a flag. In a specific implementation the 3D bounding box scale may include parameters to rescale samples in the 3D bounding box from a local coordinate system used during reconstruction to a real-world size. The 3D bounding box scale may indicate a scale to be applied to the 3D bounding box parameters that may be specified for an object.

For example, a volumetric frame of a point cloud as reconstructed in a 3D bounding box at step 1205 may employ an arbitrary unitless sizes according to a local coordinate system, such as a cartesian coordinate system. The 3D bounding box scale may be implemented as a transform that can be applied to scale the entire point cloud in the bounding box by transforming the local coordinate system to a final target 3D coordinate system that describes objects in real-world size. This allows the point cloud to be sized correctly so that the reconstructed point cloud can be overlaid onto real world video (e.g., without significant additional processing by a corresponding application at a decoder and/or without user intervention at the decoder). The 3D bounding box scale may be a factor based on a sample density in the 3D bounding box and a size of the 3D bounding box. For example, the 3D bounding box scale may correlate the number of spatial units in a point cloud frame and a step size value defined based on spatial frequency in the 3D bounding box. As a specific example, the 3D bounding box scale may indicate a number of steps and a step size (e.g., in meters) that is equal to a quotient of desired spatial frequency divided by a number of spatial units in the point cloud frame. In some cases, the 3D bounding box scale may be obtained from the V-PCC bitstream in a soi_3d_bounding_box_scale_log2 parameter in a SOI SEI message.

Further, the flag may indicate whether 3D bounding box information is present in the V-PCC bitstream. For example, a value of the flag can indicate whether to apply the 3D bounding box scale to the 3D bounding box. As a specific example, the flag can be encoded as a soi_3d_bounding_box_present_flag. The soi_3d_bounding_box_present_flag can indicate whether the soi_3d_bounding_box_scale_log2 is encoded in the SOI SEI message in the V-PCC bitstream. In a specific example, the soi_3d_bounding_box_present_flag can be set equal to one to indicate that 3D bounding box information is present in the current SOI SEI message or can be set equal to zero to indicate that 3D bounding box information is not present in the SOI SEI message.

In addition, the 3D bounding box may be scaled in units of meters. Accordingly, the V-PCC bitstream may contain a flag to indicate whether the 3D bounding box is sized in meters. In a specific example, the flag may be a vui_unit_in_metres_flag encoded into an atlas SPS in the V-PCC bitstream. The vui_unit_in_metres_flag may be set equal to one to specify that the real-world coordinates information is expressed in meters or set equal to zero to specify that the world coordinates are unitless.

After rendering, the point cloud containing the reconstructed atlas frame as projected onto the geometry can also be forwarded for display. Rendering may include placing a viewport in a position relative to the 3D bounding box. This converts the 3D image into a 2D image that can be viewed on the user's screen. For example, the rendered content can be rendered and combined with real time video data to create AR content and then displayed to the user on a user device, such as a smart phone, tablet, laptop, etc. By employing the 3D bounding box scale, the rendered reconstructed point cloud can be directly matched to the coordinates used by applications that employ real world dimensions and sizes. As such, the rendered point cloud can be easily overlaid onto video data for AR applications. As another example, the rendered point cloud can be easily positioned into any digital space that is configured based on real world dimensions. As such, the 3D bounding box scale and associated flags result in additional functionality at both the encoder and the decoder as well as support increased coding efficiency.

Figure 13:
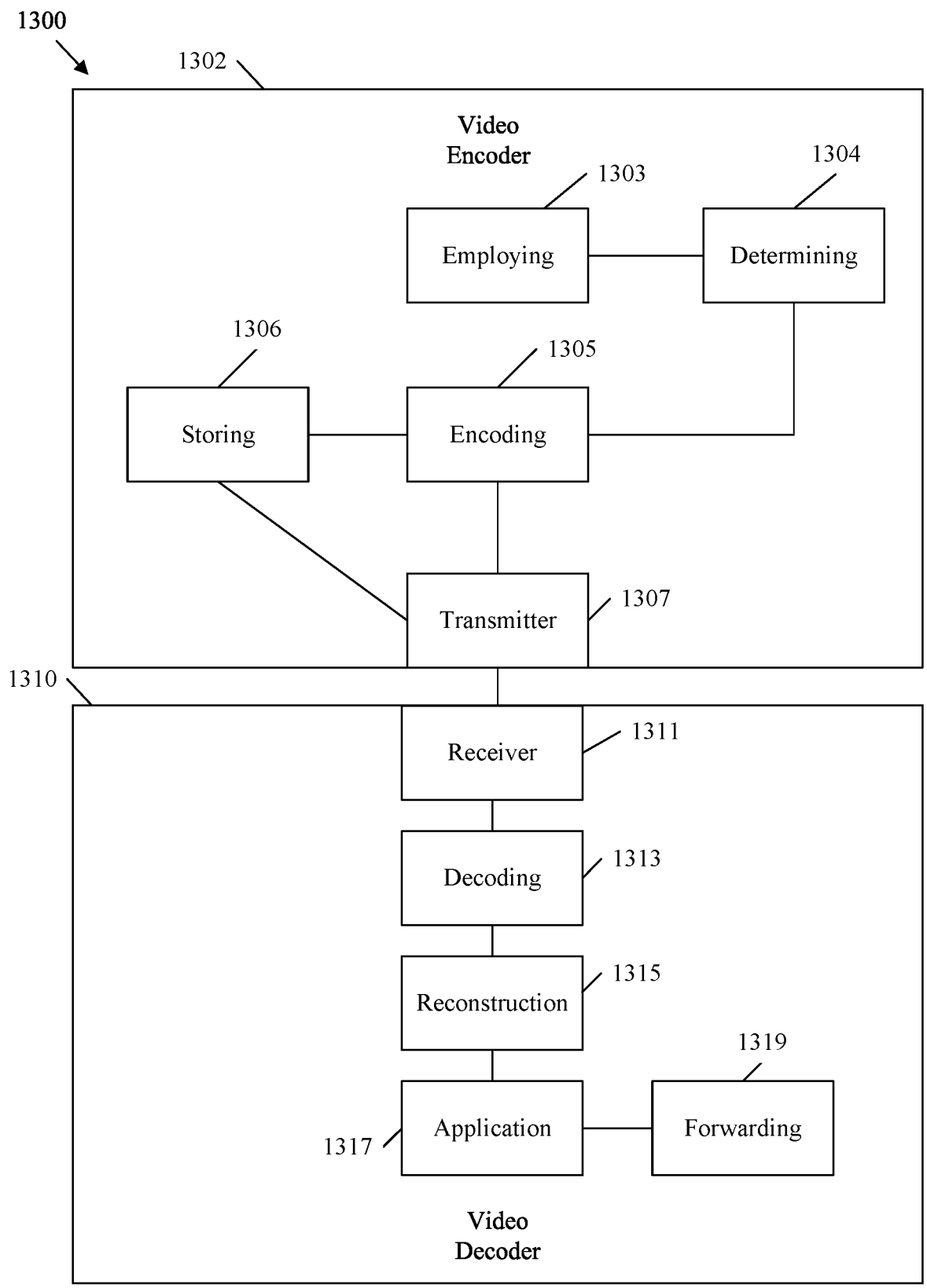
FIG. 13 is a schematic diagram of an example system for coding a PCC bitstream to support scaling a point cloud upon reconstruction.

FIG. 13 is a schematic diagram of an example system 1300 for coding a PCC bitstream, such as V-PCC bitstream 900, to support scaling a point cloud upon reconstruction, for example according to mechanism 800. System 1300 may be implemented by an encoder and a decoder such as a codec system 200, an encoder 300, a decoder 400, and/or a video coding device 1000. As such, the system 1300 may operate on point cloud media 500, which is separated into a set of patches 603 and encoded into an occupancy frame 710, a geometry frame 720, an atlas frame 730 and/or an attribute frame. Further, system 1400 may be employed when implementing method 100, 1100, and/or 1200.

The system 1300 includes a video encoder 1302. The video encoder 1302 comprises an employing module 1303 for employing orthographic projection onto a 3D bounding box to generate a plurality of 2D patches representing a point cloud. The video encoder 1302 further comprises a determining module 1304 for determining a 3D bounding box scale for application to the 3D bounding box. The video encoder 1302 further comprises an encoding module 1305 for encoding the 2D patches into an atlas frame in a bitstream. The encoding module 1305 is further for encoding the 3D bounding box scale into the bitstream. The video encoder 1302 further comprises a storing module 1306 for storing the bitstream for communication toward a decoder. The video encoder 1302 further comprises a transmitting module 1307 for transmitting the bitstream toward a video decoder 1310. The video encoder 1302 may be further configured to perform any of the steps of method 1100.

The system 1300 also includes a video decoder 1310. The video decoder 1310 comprises a receiving module 1311 for receiving a bitstream comprising a plurality of 2D patches in an atlas frame and a 3D bounding box scale. The video decoder 1310 further comprises a decoding module 1313 for decoding the patches. The video decoder 1310 further comprises a reconstruction module 1315 for reconstructing a point cloud by converting the patches to a 3D patch coordinate system defined by each projection plane of the 3D bounding box. The video decoder 1310 further comprises an application module 1317 for applying the 3D bounding box scale to the 3D bounding box. The video decoder 1310 further comprises a forwarding module 1319 for forwarding reconstructed point cloud for display. The video decoder 1310 may be further configured to perform any of the steps of method 1200.

Various rendering technologies exist to render video data. However, a simplistic application of rendering technologies to PCC video data may result in an inefficient rendering process. For example, many types of video data include a single type of data that can be decoded, transferred from a CPU to a graphic processing unit (GPU), and rendered for display. However, PCC employs multiple types of video data that interact with each other. Accordingly, some rendering systems may decode and transfer atlas, geometry, occupancy, and/or attribute video data from the CPU to the GPU for certain rendering tasks. Then the data is transferred back to the CPU to be combined. The results are then transferred back to the GPU for complete rendering prior to display. Such movement between the CPU and GPU results in multiple transfers between CPU buffers and GPU buffers for each rendered frame, which significantly increases latency and resource usage in the rendering process.

Also disclosed herein is a V-PCC renderer configured to prevent repeated memory movements during the rendering process. The CPU may be used to decode atlas data (e.g., patches), occupancy, geometry (e.g., vertexes), and/or attribute data. Such data is stored in one or more buffers, such as a vertex buffer and/or a uniform buffer. GPU shaders can then be bound to the data in the buffers to reconstruct a 3D point cloud and render a 2D image from the point cloud. For example, a GPU shader can apply occupancy as a texture to remove patch data, geometry data, and/or attribute data that are artifacts from the compression process. Another GPU shader can initialize a model matrix and generate vertices in a 3D model from the geometry data. Yet another shader can project patches and/or attributes onto the vertices as textures. This can be performed without copying such data from CPU buffers to GPU buffers. Transforms can also be used to generate a 2D image for display from the 3D point cloud. Textures, such as sub-blocks of patches, can be assigned to multiple shaders, which increases parallel processing capabilities at the GPU. In some examples, an entire frame of a V-PCC image can be rendered with a single draw call to the GPU. Such rendering can be performed fast enough to allow most user equipment devices to employ V-PCC content in augmented reality (AR) applications. As such, the disclosed examples increase capabilities of decoders when decoding V-PCC data. Further, the present examples decrease processor, memory, and/or GPU resource usage, and hence increase the functionality of a decoder.

Figure 14:
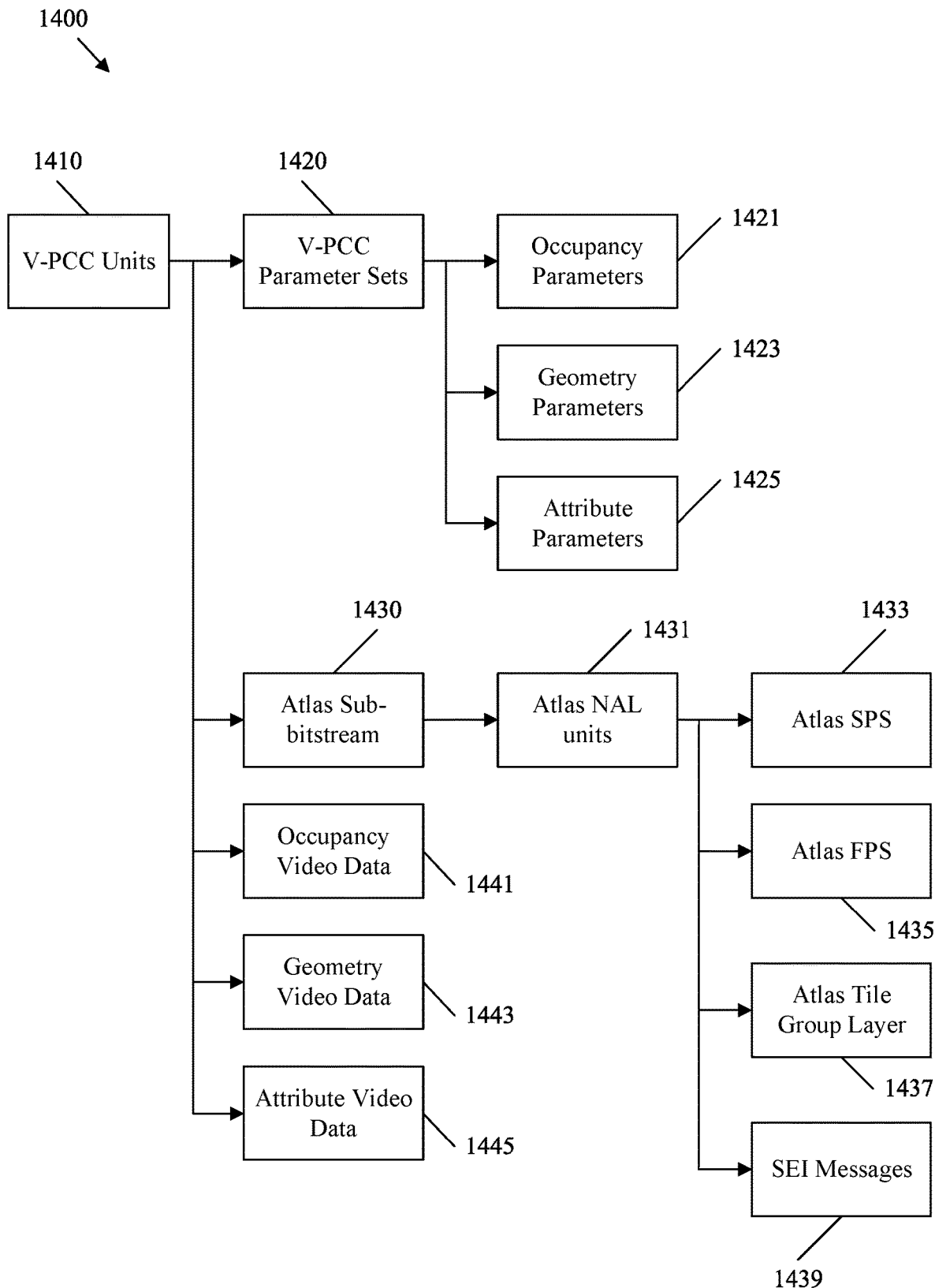
FIG. 14 is a schematic diagram of an example set of data units in a V-PCC bitstream.

FIG. 14 is a schematic diagram of an example set of data units 1400 in a V-PCC bitstream. For example, the data units 1400 may be included in a V-PCC bitstream 900. Hence, data units 1400 may be used in conjunction with method 100, 1100, and/or 1200, codec system 200, encoder 300, decoder 400, point cloud media 500, patches 603, occupancy frame 710, geometry frame 720, atlas frame 730, mechanism 800, video coding device 1000, and/or system 1300.

The data units 1400 include a plurality of V-PCC units 1410, which are data units that contain V-PCC data. A V-PCC unit 1410 may comprise a payload and an indicator of the type of data contained therein. The V-PCC units 1410 can be organized into a sub-bitstream of V-PCC parameter sets 1420, which are any V-PCC units 1410 that contain parameters used to indicate how associated video data is coded. The V-PCC parameter sets 1420 may include occupancy parameters 1421, geometry parameters 1423, and/or attribute parameters 1425. The occupancy parameters 1421 include data that describes how to interpret coded occupancy video data 1441. The geometry parameters 1423 include data that describes how to interpret geometry video data 1443. The attribute parameters 1425 include data that describes how to interpret attribute video data 1445. The V-PCC parameter sets 1420 may be substantially similar to V-PCC parameter set 911.

The V-PCC units 1410 can be further organized into sub-bitstreams including occupancy video data 1441, geometry video data 1443, and/or attribute video data 1445, which may be include data substantially similar to occupancy frame 915, geometry frame 917, and attribute frame 919, respectively. The V-PCC units 1410 may also comprise an atlas sub-bitstream 1430, which may include one or more atlas frames 913. The atlas sub-bitstream 1430 may include atlas NAL units 1431, which are data units that contain atlas data and are sized for transmission across a network. The atlas NAL units 1431 may contain an atlas sequence parameter set (SPS) 1433, an atlas frame parameter set (FPS), an atlas tile group layer 1437, and/or supplemental enhancement information (SEI) messages 1439. An atlas SPS 1433 contains data that describes coding mechanism settings related to an entire sequence of atlas data. The atlas FPS 1435 contains data that describes coding mechanism settings related to one or more corresponding V-PCC frames. The atlas tile group layer 1437 contains data that describes coding mechanism settings related to one or more corresponding atlas tile groups, which may include patches or sub-blocks thereof. The SEI messages 1439 may contain data that is not used to decode video data, but may be used to check bitstreams for standards compliance and/or used to describe video playback settings.

Figure 15:
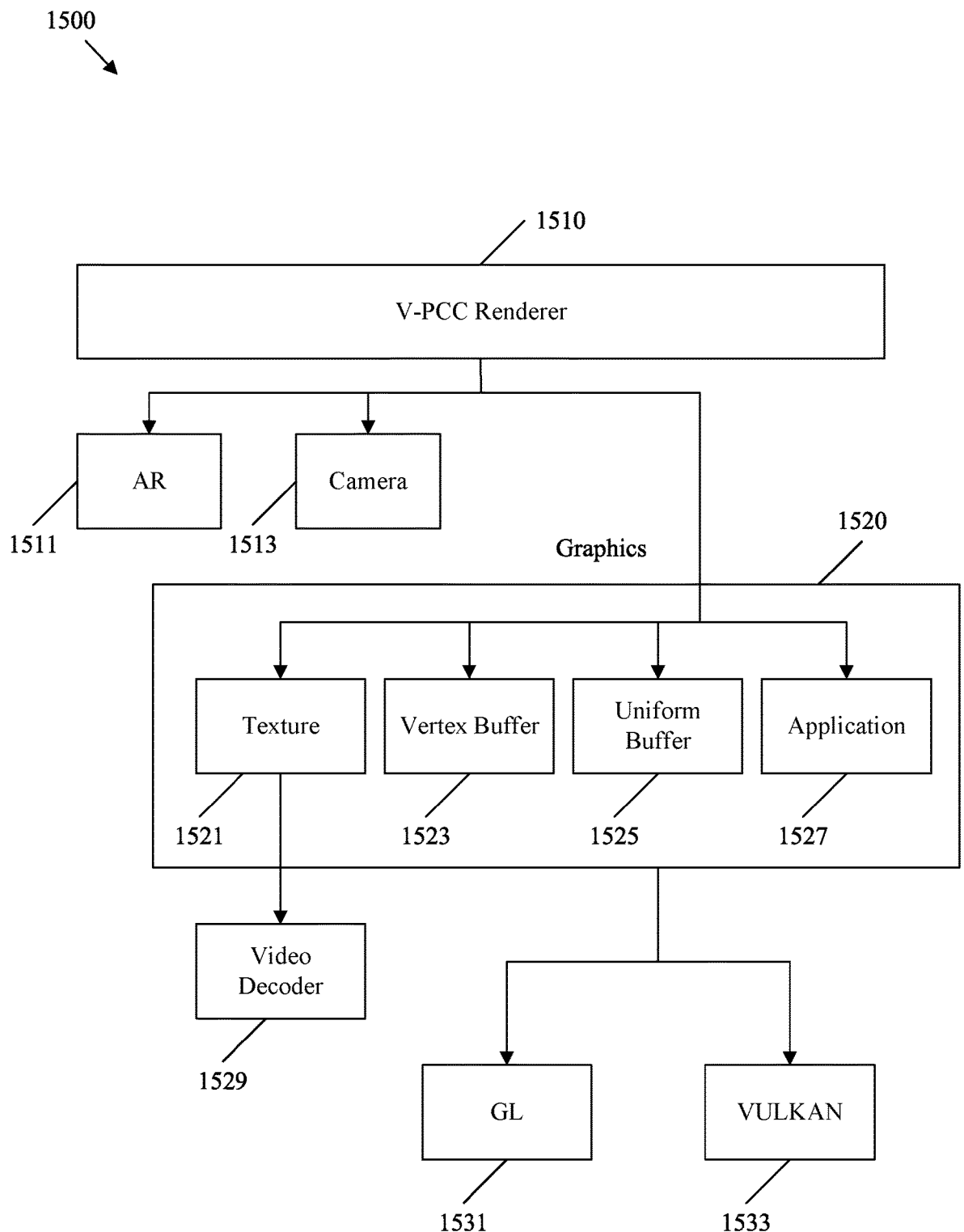
FIG. 15 is a schematic diagram of an example V-PCC renderer.

FIG. 15 is a schematic diagram 1500 of an example V-PCC renderer 1510. The V-PCC renderer 1510 may be used in a codec system 200, decoder 400, and/or video coding device 1000. As such, the V-PCC renderer 1510 may also be used in conjunction with method 100, 1100, and/or 1200, encoder 300, point cloud media 500, patches 603, occupancy frame 710, geometry frame 720, atlas frame 730, mechanism 800, V-PCC bitstream 900, system 1300, and/or data units 1400.

The V-PCC renderer 1510 is implemented employing both software and hardware. As such, the V-PCC renderer 1510 is a set of components that employ hardware resources to reconstruct coded point clouds for display to a user, for example via a display. The V-PCC renderer 1510 may include a camera 1513, which is a component configured to employ a hardware camera, such as a digital camera, to capture images and/or video. The V-PCC renderer 1510 may also include an augmented reality (AR) component 1511. The AR component 1513 is configured overlay pre-recorded and/or generated graphics, for example from a graphics component 1520, onto images taken by the camera 1513 for display to a user. This allows the AR component 1511 to augment the user's view of displayed reality with pre-recorded and/or generated graphics, such as V-PCC video.

The V-PCC renderer 1510 also includes the graphics component 1520, which is a component configured to decode and reconstruct point clouds for display to a user. The graphics component 1520 may include a texture component 1521, a vertex buffer 1523, a uniform buffer 1525, and an application 1527. The texture component 1521 is configured to reconstruct various textures from coded video. The texture component 1521 may comprise a video decoder 1529, which is a component configured to decode atlas, geometry, occupancy, attributes, and/or associated parameters from a V-PCC bitstream. The texture component 1521 can then treat each of the decoded atlas, geometry, occupancy, and/or attributes as textures when reconstructing V-PCC frames for display and/or store such data in memory. The vertex buffer 1523 is a memory component (e.g., in cache) configured to store vertices from the geometry data. The uniform buffer 1525 is a memory component (e.g., in cache) configured to store atlas data, occupancy, and/or attributes for application to the vertices in the vertex buffer 1523. The application 1527 is a component configured to apply the atlas data, occupancy, and/or attributes to the vertices. For example, the application 1527 may initialize a model matrix and project the atlas data, occupancy, and/or attributes onto the vertices, for example by applying corresponding transforms. As such, the graphics component 1520 can decode and reconstruct V-PCC frames for use by the AR component 1511 and/or output from the camera component 1513 for use in rendering by the V-PCC renderer 1510.

The graphics component 1520 may employ various application programming interfaces (APIs) to interact with hardware. For example, the graphics component 1520 may communicate with hardware via an open graphics library (OPENGL) 1531 and/or VULKAN 1533, which are both example graphics APIs.

In an example implementation, the rendering process may be described as follows. The CPU and/or the GPU can begin by initializing global variables, which may include initializing a model matrix. The model matrix may define a transformation from an object's model space to world space. The model matrix can be initialized so that the model fits to a normalized unit square in world space coordinates from (−0.5,−0.5,−0.5) to (0.5,0.5,0.5), using the following transformation, were b is the model's bounding box.

$$vec3 s = b[1] - b[0];$$

$$mModel = yawPitchRoll(radians(ctx.rot[0]), radians(ctx.rot[1]), radians(ctx.rot[2])) * scale(vec3(1.0f/max(max(s.x,s.y),s.z))) * translate(-0.5f*(b[1]+b[0]));$$

This transformation translates the model so the model is centered around the origin. Then the model is scale uniformly by 1/max dimension of the bounding box. Then the transform rotates the model so that the model is aligned with a global x, y, z axis. A camera view matrix can also be initialized. The camera view matrix may be employed to create a transformation from world space to a camera space. A projection matrix can also be employed, which transforms the model from a camera space to a screen space.

The transformation matrices can be updated as described above by the CPU, the GPU, or combinations thereof. The GPU can then render the point cloud, for example based on geometry, atlas, occupancy, and/or attributes decoded by the decoder (e.g., operating on the CPU) and stored in GPU buffers. For each frame, the point cloud can be rendered with the following process. A block to patch map can be generated. The block to patch map defines a mapping of blocks in atlas space to corresponding patches.

GPU shader programs can the be bound to the data in the GPU buffers. For example, a geometry shader program can be bound to emit point directly onto the model matrix by the GPU. This reduces CPU overhead and improves overall system performance. This concept can also be applied using a compute shader approach. GPU textures can also be updated. For example, the decoded images can be bound from the occupancy, geometry, and attribute video streams directly as GPU textures in a luma chrominance (YUV) color space with no copy between the CPU buffers and GPU buffers.

GPU buffers can then be updated. For example, a uniform buffer (ubo) can be updated with the following data: frame width, frame height, occupancy resolution, and model view projection (modelViewProj) matrix. The uniform buffer may be stored in cache memory and may contain data that is constant for a corresponding frame. The GPU can then render the patches. In some examples, the GPU can render all patches associated with a frame sequentially using a plurality (e.g., six) draw calls. In another example, the GPU can render all patches in parallel using a single draw call. The parallel option may further reduce driver overhead and improves performance.

The example that includes rendering patches using separate draw calls may be implemented as follows. For each patch a vertex buffer can be updated. The vertex buffer defines the blocks in atlas space mapping to a corresponding patch. The uniform buffer can also be updated for each patch. The uniform buffer may contain a patch data ubo (patch_data_ubo) section, which contains the patch-specific information including the patch 2D offset and size in atlas space for sampling the textures, the patch 3d offset in world space, the patch axes, the patch projection mode, and a canvas to patch matrix, which defines a mapping from atlas space to patch space. This matrix may act as an inverse of the patch to canvas matrix. A draw call can also be employed to render the points. The primitive count can be set to the number of blocks corresponding to the patch. The primitives (points) are emitted on the GPU directly using the geometry shader or compute shader.

The example that includes rendering patches using a single draw call may be implemented as follows. The uniform buffer can be updated. The uniform buffer may contain the patch data as a global array, which includes a canvas/atlas to patch matrices. A vertex buffer can also be updated. In the vertex buffer, each entry may define a block in atlas space and a corresponding patch index. A single draw call can be employed to render the points of each patch (e.g., six patches per frame) in the frame onto the vertices. The primitive count can be set to the number of blocks. Primitives (points) are emitted on GPU directly using geometry shader or compute shader.

The GPU rendering process can be implemented as follows. A vertex shader can copy the per-vertex data to a geometry shader. The geometry shader enables instancing, where each instance emits multiple vertices. This may reduce CPU overhead. The max number of vertices emitted per geometry shader invocation may equal the occupancy resolution times the number of layers. Each invocation may process a sub-block in atlas space. The rendering may be performed using the following algorithm.

For each x, y in sub-block:
    if occupancy_value[x,y]=0, reject;
    Convert atlas coordinates x,y to local patch coordinates u,v;
    For each layer:
        Get geometry value [x,y, layer_index];
        Get attribute value [x,y, layer_index]
        Set point size;
        Emit vertex;

A rendering mechanism for V-PCC data has been described. The approach is based on utilization of the geometry or the compute shaders on the GPU and direct mapping of the video texture on the output. The fact that most of the data is processed on the GPU beyond decompression may increase rendering speed. The rendering may be performed based on geometry or compute shader utilization. The output of the video decoder is directly used in the GPU memory to reduce the processing latency that is associated with data transfer from the CPU to GPU memory space. This allows memory copy to be avoided. The patch can be subdivided into several independent blocks of a size that can be processed by a single geometry shader. This may be referred herein as instancing. The patch index data is associated to each vertex. This allows substantially instantaneous 3d reconstruction from the corresponding output of the hardware video decoders and associated decompressed metadata. The early rejection process for rendering is based on the block to patch information carried on the occupancy map and the atlas frames.

Figure 16:
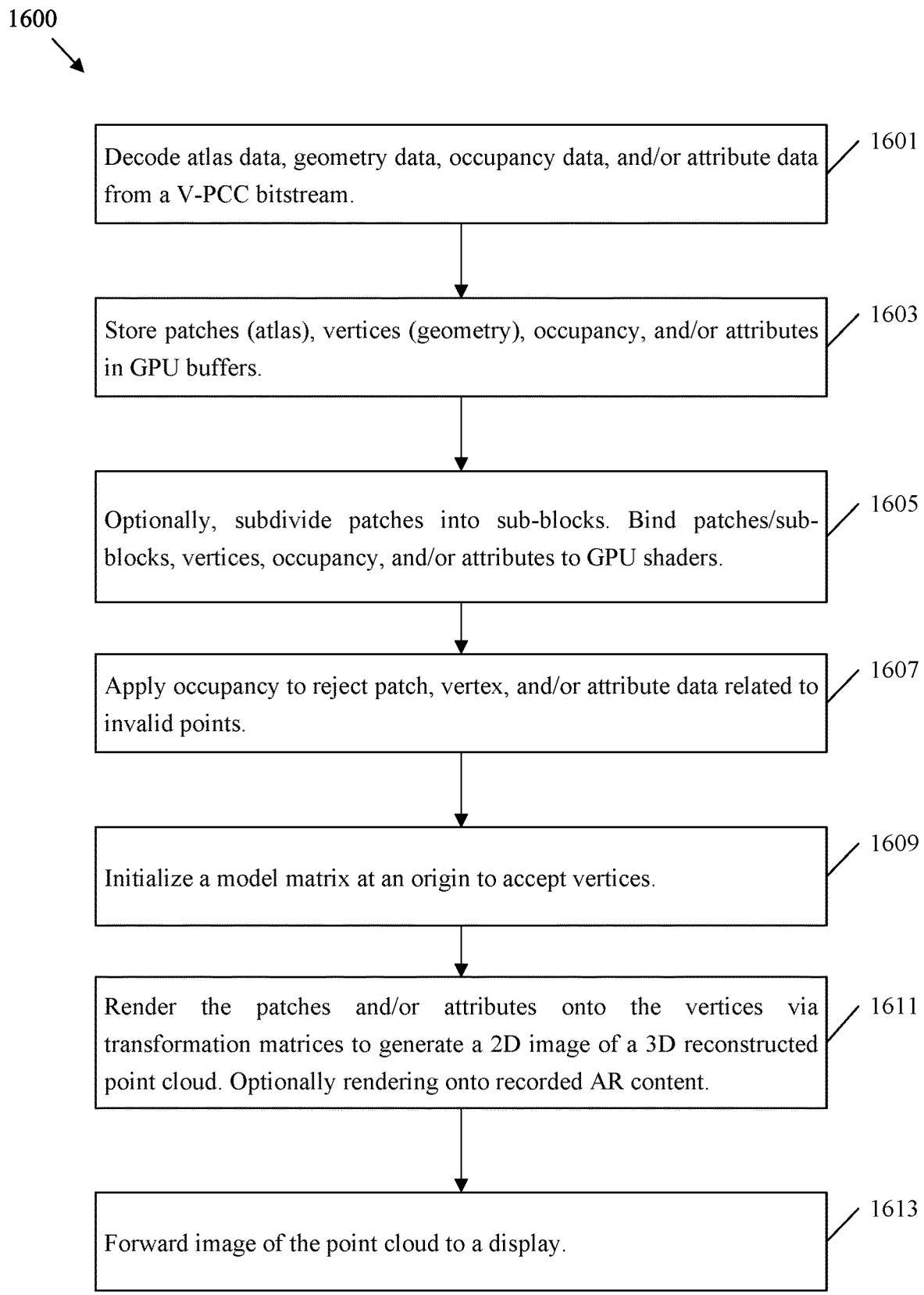
FIG. 16 is a flowchart of an example method of rendering a V-PCC bitstream.

FIG. 16 is a flowchart of an example method 1600 of rendering a V-PCC bitstream, such as a V-PCC bitstream 900 containing data units 1400. The method 1600 may be implemented on a V-PCC renderer 1510 operating on a codec system 200, decoder 400, and/or video coding device

1000. As such, the method 1600 may also be used in conjunction with method 100, 1100, and/or 1200, encoder 300, point cloud media 500, patches 603, occupancy frame 710, geometry frame 720, atlas frame 730, mechanism 800, and/or system 1300.

Method 1600 may be implemented on a user equipment (UE). A UE is any device operable by a user to decode and display video content. For example, the UE may include a V-PCC renderer 1510 implemented via a camera, a web browser, a CPU, CPU buffers, a GPU, GPU buffers, a receiver, a transmitter, and/or a connected display. The display may be part of the UE or may be a separate device connected via a wired or wireless connection. Method 1600 may begin when the UE is directed to decode and display V-PCC images, for example as part of an augmented reality (AR).

At step 1601, a CPU operating on the decoder may decode a V-PCC bitstream. This may include decoding atlas data from the V-PCC bitstream. The atlas data may include patches, geometry data include vertices, occupancy data including occupancy, and/or attribute data including attributes. The patches/atlas, vertices/geometry, occupancy and/or attributes are stored in one or more graphics processing unit (GPU) buffers at step 1603 after such data is decoded. For example, the CPU may decode the V-PCC bitstream and store the data CPU buffers. The CPU may issue one or more draw calls that initiate the GPU. The patches/atlas, vertices/geometry, occupancy and/or attributes can be transferred from the CPU buffer(s) to the GPU buffer(s) as part of the draw call(s). For example, the GPU buffers may include a uniform buffer that stores the patches and a vertex buffer that stores the vertices.

The GPU may then reconstruct a 3D V-PPC point cloud from the data in the GPU buffers and render a 2D image from the point cloud for display to the user without moving the V-PCC data back to the CPU buffers. Retaining the V-PCC data in the GPU buffers during rendering prevents copying data between buffers, which reduces latency and resource usage at the decoder/renderer. As such, the GPU shaders render the patches on the vertices without copying patches or vertices into CPU memory. The GPU may render each frame based on a single draw call, or may render each patch of a frame based on a single draw call.

At step 1605, the GPU may optionally subdivide one or more of the patches into sub-blocks, which supports increased parallel processing. The GPU may then treat each set of V-PCC data as a texture. The GPU may bind a GPU shader to each texture, which allows each type of V-PCC data to be rendered in parallel and combined as desired without transferring the data back to the CPU for further processing. Accordingly, the GPU binds the patches and/or sub-blocks thereof, vertices, occupancy, and/or attribute data (if any) to corresponding GPU shaders. The GPU shaders may include a geometry shader, a compute shader, or combinations thereof.

At step 1607, a GPU shader applies the occupancy to the patches, geometry, and/or attributes in the GPU buffers. In some cases, excess data is included as atlas, geometry, and/or attribute data in order to increase compression. The occupancy can be applied to remove such excess data that does not include actual video data. Accordingly, the occupancy can be applied to the patches, vertices, and/or attributes. Hence, the occupancy can be applied to reject one or more points associated with the vertices, patches, and/or attributes prior to rendering the patches onto the vertices.

At step 1609, the GPU and/or corresponding shaders can initialize a model matrix to fit the vertices to a normalized unit square around an origin prior to rendering the patches onto the vertices. The model matrix creates a space to receive the vertices of the point cloud. The GPU shader(s) can then create the geometry of the reconstructed point cloud by including the vertices in the model matrix. In some examples, a maximum number of vertices emitted by a geometry shader may be equal to an occupancy resolution times a number of layers of vertices in the geometry data.

At step 1611, the GPU shaders can render the patches onto the vertices. For example, rendering the patches onto the vertices includes projecting the patches onto points of the vertices. Further, the GPU shaders can render the attributes, if any, onto the vertices. This creates a 3D point cloud including 3D vertices including patch textures and/or attribute data. Various transformation matrices can then be applied to the model matrix to generate an appropriately sized 2D image on the 3D reconstructed point cloud. For example, the transformation matrices may include a canvas to patch matrix for transforming from an atlas space to a patch space and/or model space, a model matrix for transforming from a model space to a world space (e.g., with real world coordinates), a camera view matrix for transforming the world space to a camera space (e.g., to create a 2D view of a 3D point cloud), and a projection matrix from transforming from the camera space to a screen space (e.g., using coordinates that are usable by a display).

In some cases, rendering the patches onto the vertices includes rendering all patches associated with a single V-PCC frame onto the vertices in parallel in response to a single draw call from the CPU. In some cases, rendering the patches onto the vertices includes rendering each patch and/or sub-block associated with a single V-PCC frame onto the vertices in response to a separate draw call from the CPU. Rendering patches in parallel may include obtaining patch indices for the patches from the GPU buffers and determining patch orientation for each of the patches based on the patch indices. This allows the GPU to correctly orient and render the patches without consulting the CPU. Each patch may be rendered by a different GPU shader. When sub-blocks are used, each sub-block can be rendered by a different GPU shader.

When AR is employed, rendering the patches onto the vertices via transformation matrices may include rendering the patches and vertices onto a recorded image to create AR content. For example, the GPU may receive a recorded image from an attached camera via a draw call. The GPU can then render the V-PCC content onto the recorded image data to create a composite image that includes both an image recorded substantially in real time and an overlaid rendering of a point cloud that is either prerecorded and/or pregenerated by an encoder.

At step 1613, the GPU can forward the 2D image of the 3D point cloud from the GPU buffer(s) toward a screen for display.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, comprising:
receiving a bitstream comprising a plurality of two-dimensional (2D) patches in an atlas frame and a scene object information (SOI)_three-dimensional (3D) bounding box scale log2 (soi_3d_bounding_box_scale_log2), wherein the atlas frame contains atlas samples onto which the 2D patches are projected to correspond to a volumetric frame, and wherein the soi_3d_bounding_box_scale_log2 is a parameter that indicates a 3D bounding box scale to be applied to a 3D bounding box;
decoding the 2D patches;
reconstructing a point cloud by converting the 2D patches to a 3D patch coordinate system defined by each projection plane of the 3D bounding box; and
applying the 3D bounding box scale to the 3D bounding box.

2. The method of claim 1, the bitstream further comprising a flag indicating whether 3D bounding box information is present, and applying the 3D bounding box scale based on a value of the flag.

3. The method of claim 1, further comprising transforming the 3D patch coordinate system to a target 3D coordinate system in units of meters.

4. The method of claim 1, the bitstream further comprising occupancy components, geometry components, and attribute components, the point cloud being reconstructed based on at least one of the occupancy components, the geometry components, and the attribute components.

5. The method of claim 4, further comprising informing the decoder which samples in 2D components are associated with video data, the geometry components including information indicating a location of samples in 3D space, and the attribute components providing properties of samples.

6. The method of claim 1, further comprising forwarding a reconstructed atlas frame for display.

7. A method implemented by an encoder, comprising:
employing orthographic projection onto a three-dimensional (3D) bounding box to generate a plurality of two-dimensional (2D) patches representing a point cloud;
encoding the 2D patches into an atlas frame in a bitstream, wherein the atlas frame contains atlas samples onto which the 2D patches are projected to correspond to a volumetric frame;
determining a 3D bounding box scale for application to the 3D bounding box;
encoding the 3D bounding box scale a scene object information (SOI) 3D bounding box scale log2 (soi_3d_bounding_box_scale_log2)_into the bitstream, wherein the soi_3d_bounding_box_scale_log2 is a parameter that indicates the 3D bounding box scale to be applied to the 3D bounding box; and
storing the bitstream for communication toward a decoder.

8. The method of claim 7, the 3D bounding box scale including parameters to rescale samples in the 3D bounding box from a local coordinate system to a real-world size.

9. The method of claim 7, further comprising encoding into the bitstream a flag indicating whether 3D bounding box information is present, a value of the flag indicating whether to apply the 3D bounding box scale to the 3D bounding box.

10. The method of claim 7, the 3D bounding box being scaled in units of meters.

11. The method of claim 7, further comprising encoding occupancy components, geometry components, and attribute components into the bitstream.

12. The method of claim 11, the occupancy components inform the decoder which samples in the atlas frame are associated with video data, the geometry components containing information indicating a location of the samples in 3D space, the attribute components providing properties of the samples.

13. A video coding device, comprising:
a memory containing instructions; and
a processor coupled to the memory, wherein the instructions, when implemented by the processor, cause the video coding device to:
receive a bitstream comprising a plurality of two-dimensional (2D) patches in an atlas frame and a scene object information (SOI)_three-dimensional (3D) bounding box scale log2 (soi_3d_bounding_box_scale_log2), wherein the atlas frame contains atlas samples onto which the 2D patches are projected to correspond to a volumetric frame, and wherein the soi_3d_bounding_box_scale_log2 is a parameter that indicates a 3D bounding box scale to be applied to a 3D bounding box;
decode the 2D patches;
reconstruct a point cloud by converting the 2D patches to a 3D patch coordinate system defined by each projection plane of a 3D bounding box; and
apply the 3D bounding box scale to the 3D bounding box.

14. The video coding device of claim 13, the bitstream further comprising a flag indicating whether 3D bounding box information is present, the 3D bounding box scale being applied based on a value of the flag.

15. The video coding device of claim 13, the 3D patch coordinate system being transformed to a target 3D coordinate system in units of meters.

16. The video coding device of claim 13, the bitstream further comprising occupancy components, geometry components, and attribute components, the point cloud being reconstructed based on at least one of the occupancy components, the geometry components, and the attribute components.

17. The video coding device of claim 16, the occupancy components informing the decoder which samples in 2D components are associated with video data, the geometry components including information indicating a location of samples in 3D space, and the attribute components providing properties of samples.

* * * * *

UNITED STATES PATENT AND TRADEMARK OFFICE
CERTIFICATE OF CORRECTION

PATENT NO. : 12,244,858 B2
APPLICATION NO. : 17/865376
DATED : March 4, 2025
INVENTOR(S) : Vladyslav Zakharchenko et al.

It is certified that error appears in the above-identified patent and that said Letters Patent is hereby corrected as shown below:

In the Claims

Column 43, Claim 1, Lines 27-43, should read:
1. A method implemented by a decoder, comprising:
    receiving a bitstream comprising a plurality of two-dimensional (2D) patches in an atlas frame and a scene object information (SOI) three-dimensional (3D) bounding box scale log2 (soi_3d_bounding_box_scale_log2), wherein the atlas frame contains atlas samples onto which the 2D patches are projected to correspond to a volumetric frame, and wherein the soi_3d_bounding_box_scale_log2 is a parameter that indicates a 3D bounding box scale to be applied to a 3D bounding box;
    decoding the 2D patches;
    reconstructing a point cloud by converting the 2D patches to a 3D patch coordinate system defined by each projection plane of the 3D bounding box; and
    applying the 3D bounding box scale to the 3D bounding box.

Column 43, Claim 7, Lines 63-67, through Column 44, Lines 1-14, should read:
7. A method implemented by an encoder, comprising:
    employing orthographic projection onto a three-dimensional (3D) bounding box to generate a plurality of two-dimensional (2D) patches representing a point cloud;
    encoding the 2D patches into an atlas frame in a bitstream, wherein the atlas frame contains atlas samples onto which the 2D patches are projected to correspond to a volumetric frame;
    determining a 3D bounding box scale for application to the 3D bounding box;
    encoding a scene object information (SOI) 3D bounding box scale log2 (soi_3d_bounding_box_scale_log2) into the bitstream, wherein the soi_3d_bounding_box_scale_log2 is a parameter that indicates the 3D bounding box scale to be applied to the 3D bounding box; and
    storing the bitstream for communication toward a decoder.

Signed and Sealed this
Fifteenth Day of April, 2025

Coke Morgan Stewart
*Acting Director of the United States Patent and Trademark Office*

CERTIFICATE OF CORRECTION (continued)
U.S. Pat. No. 12,244,858 B2

Column 44, Claim 13, Lines 33-54, should read:

13. A video coding device, comprising:
    a memory containing instructions; and
    a processor coupled to the memory, wherein the instructions, when implemented by the processor, cause the video coding device to:
    receive a bitstream comprising a plurality of two-dimensional (2D) patches in an atlas frame and a scene object information (SOI) three-dimensional (3D) bounding box scale log2 (soi_3d_bounding_box_scale_log2), wherein the atlas frame contains atlas samples onto which the 2D patches are projected to correspond to a volumetric frame, and wherein the soi_3d_bounding_box_scale_log2 is a parameter that indicates a 3D bounding box scale to be applied to a 3D bounding box;
    decode the 2D patches;
    reconstruct a point cloud by converting the 2D patches to a 3D patch coordinate system defined by each projection plane of a 3D bounding box; and
apply the 3D bounding box scale to the 3D bounding box.